(12) United States Patent
Gu et al.

(10) Patent No.: US 12,267,196 B1
(45) Date of Patent: Apr. 1, 2025

(54) METHOD FOR PROCESSING OFDM SIGNAL, SYSTEM FOR TRANSMITTING OFDM SIGNAL, AND DEVICE

(71) Applicant: CHONGQING SATELITE NETWORK SYSTEM CO., LTD., Chongqing (CN)

(72) Inventors: Linhai Gu, Chongqing (CN); Guangnan Zou, Chongqing (CN); Xuesong Wang, Chongqing (CN); Xiaolin Wu, Chongqing (CN)

(73) Assignee: CHONGQING SATELITE NETWORK SYSTEM CO., LTD., Chongqing (CN)

( * ) Notice: Subject to any disclaimer, the term of this patent is extended or adjusted under 35 U.S.C. 154(b) by 0 days.

(21) Appl. No.: 18/861,760

(22) PCT Filed: Nov. 17, 2023

(86) PCT No.: PCT/CN2023/132249
§ 371 (c)(1),
(2) Date: Oct. 30, 2024

(51) Int. Cl.
*H04L 27/26* (2006.01)
(52) U.S. Cl.
CPC ................. *H04L 27/2615* (2013.01)
(58) Field of Classification Search
CPC .................................................. H04L 27/2615
See application file for complete search history.

(56) References Cited

U.S. PATENT DOCUMENTS 8,947,996 B2 * 2/2015 Gao .................... H04L 27/2698
370/208
2005/0220199 A1 * 10/2005 Sadowsky ........... H04L 27/2634
375/260

(Continued)

FOREIGN PATENT DOCUMENTS

| CN | 116192589 A | 5/2023 |
| CN | 116723072 A | 9/2023 |
| KR | 20190006966 A | 1/2019 |

OTHER PUBLICATIONS

Lei Xu et al., "Combination Sine PS Method for PAPR Reduction in OFDM Systems," IEEE, 978-1-5090-3025-5/17, 2017, pp. 425-428.

(Continued)

*Primary Examiner* — Jaison Joseph
(74) *Attorney, Agent, or Firm* — Baratta Law PLLC; Lawrence A. Baratta, Jr.

(57) ABSTRACT

Provided are a method for processing an OFDM signal, a system for transmitting an OFDM signal, and a device, which effectively reduce a peak to average power ratio of the OFDM signal. The method includes: determining a frequency of each of OFDM modulation symbols, where the OFDM modulation symbols are obtained by digitally modulating the OFDM signal; determining, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies; determining, according to the frequency domain function value corresponding to each OFDM modulation symbol, an encoding matrix corresponding to the OFDM signal; and processing the OFDM signal by the encoding matrix corresponding to the OFDM signal, to obtain a target OFDM signal conforming to a change rule of the frequency domain function.

18 Claims, 11 Drawing Sheets

(56) References Cited

U.S. PATENT DOCUMENTS

| | | | | |
|---|---|---|---|---|
| 2008/0240273 | A1* | 10/2008 | Akita | H04L 1/04 |
| | | | | 375/260 |
| 2021/0226834 | A1* | 7/2021 | Shattil | H04L 27/2621 |
| 2022/0060272 | A1* | 2/2022 | Sahin | H04J 13/0011 |
| 2024/0297816 | A1* | 9/2024 | Qu | H04L 27/0008 |

OTHER PUBLICATIONS

Aug. 1, 20246, International Search Report for PCT Application No. PCT/CN2023/132249.
First Office Action of the corresponding KR application No. 10-2024-7038577 issued on Jan. 8, 2025.

* cited by examiner

METHOD FOR PROCESSING OFDM SIGNAL, SYSTEM FOR TRANSMITTING OFDM SIGNAL, AND DEVICE

TECHNICAL FIELD

The disclosure relates to the technical field of wireless communication, and particularly relates to a method for processing an orthogonal frequency division multiplexing (OFDM) signal, a system for transmitting an OFDM signal, and a device.

BACKGROUND

The OFDM is a type of multi-carrier modulation technology that divides a carrier into several orthogonal sub-carriers to overcome frequency selective fading and narrow-band interference. However, due to sub-carrier superposition in an OFDM system, the peak power of a signal will be much greater than its average power, that is, a peak to average power ratio (PAPR) is high. Since the power is limited in some scenarios, and a high peak to average power ratio causes out-of-band radiation and in-band distortion in a nonlinear transmission channel, the signal distorts and a bit error rate of the system is increased, deteriorating performance of an OFDM communication system.

An amplitude limiting method, an encoding method, a probability method and so on are used to suppress the peak to average power ratio of the OFDM system at present. However, the amplitude limiting method leads to the amplitude limiting noise, which increases the bit error rate of the system and deteriorates the system performance. The encoding method does not distort the signal, but is complex in computation and produces a mass of redundant data. The probability method is simple and intuitive, but has a large amount of computation and also requires transmission of sideband information, which increases the difficulty and cost of implementing the system.

SUMMARY

The disclosure provides a method for processing an OFDM signal, a system for transmitting an OFDM signal, and a device, which effectively reduce a PAPR of an OFDM signal and improve communication performance and sensing performance of an OFDM system through a probability method which is simple to implement and does not require transmission of sideband information.

In a first aspect, an embodiment of the disclosure provides a method for processing an OFDM signal. The method includes:
  determining a frequency of each of OFDM modulation symbols, where the OFDM modulation symbols are obtained by digitally modulating the OFDM signal;
  determining, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies;
  determining, according to the frequency domain function value corresponding to each OFDM modulation symbol, an encoding matrix corresponding to the OFDM signal; and
  processing the OFDM signal by the encoding matrix corresponding to the OFDM signal, to obtain a target OFDM signal conforming to a change rule of the frequency domain function.

According to the method for processing an OFDM signal provided in the embodiment, the frequency domain function is constructed by linearly combining the linear function with the trigonometric functions having different frequencies, the encoding matrix is constructed by the frequency domain function value corresponding to the frequency of each OFDM modulation symbol, and the whole OFDM signal is processed by the encoding matrix. Therefore, the processed target OFDM signal conforms to the change rule of the frequency domain function. The frequency domain function is formed by linearly combining the linear function with the trigonometric functions having different frequencies, such that a change rule of the frequency spectrum of the OFDM signal can satisfy the requirement of a low PAPR. Therefore, through a probability method which is simple in implementation and does not require transmission of sideband information, a PAPR of the OFDM can be effectively reduced, so as to not only improve communication performance of an OFDM system, but also improve sensing performance.

As an optional implementation, the determining of the frequency of each OFDM modulation symbol includes:
  determining a start frequency, a frequency step value and a stop frequency of the OFDM modulation symbols according to a bandwidth and a first preset parameter of the OFDM modulation symbols; and
  determining the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The determining of the start frequency, the frequency step value and the stop frequency of the OFDM modulation symbols according to the bandwidth and the first preset parameter of the OFDM modulation symbols includes:
  determining the start frequency and the stop frequency according to the bandwidth, the roll-off factor and the target symbol length of the OFDM modulation symbols; and
  determining the frequency step value according to the bandwidth, the roll-off factor and the first parameter of the OFDM modulation symbols.

As an optional implementation, based on the frequency domain function and the frequency of the OFDM modulation symbol, the determining of the frequency domain function value corresponding to the frequency of the OFDM modulation symbol includes:
  determining a first threshold and a second threshold according to a bandwidth and a roll-off factor of the OFDM modulation symbols; and
  determining, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the frequency domain function is determined through:
  weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the linear function is determined by:
determining a slope according to a bandwidth and a roll-off factor of the OFDM modulation symbols, where the slope decreases as the bandwidth and the roll-off factor increase;
determining a linear function variable according to the bandwidth and the roll-off factor of the OFDM modulation symbols and the frequency; and
determining the linear function according to the slope and the linear function variable.

As an optional implementation, phases of the trigonometric functions having different frequencies change as the roll-off factor of the OFDM signal changes; and/or
amplitudes of the trigonometric functions increase as the number of the trigonometric functions increases.

As an optional implementation, the trigonometric function is determined by:
determining a phase of the trigonometric function according to a roll-off factor of the OFDM signal;
determining a trigonometric function variable according to a bandwidth and the roll-off factor of the OFDM modulation symbols and the frequency; and
determining the trigonometric function according to the phase and the trigonometric function variable.

As an optional implementation, the frequency domain function is expressed by formulas as follows:

$$C(k) = \frac{a_0}{2\alpha \cdot B\omega} x + \sum_{i=1}^{K_1} a_1 \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

in the formulas, $C(k)$ represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

As an optional implementation, $b_i$ increases as i increases, and $b_i$ is an odd number; and/or
$d_i$ increases as i increases, and $d_i$ is an odd number.

As an optional implementation, according to the frequency domain function value corresponding to each OFDM modulation symbol, the determining of the encoding matrix corresponding to the OFDM signal includes:
determining each frequency domain function value corresponding to the OFDM modulation symbol as an encoding matrix coefficient; and
determining the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

As an optional implementation, the processing of the OFDM signal by the encoding matrix corresponding to the OFDM signal, to obtain the target OFDM signal conforming to the change rule of the frequency domain function includes:
multiplying the encoding matrix corresponding to the OFDM signal by the OFDM signal, to obtain the target OFDM signal conforming to the change rule of the frequency domain function.

In a second aspect, an embodiment of the disclosure provides a method for determining an encoding matrix. The method includes:
determining a frequency of each of OFDM modulation symbols, where the OFDM modulation symbols are obtained by digitally modulating an OFDM signal;
determining, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies; and determining, according to the frequency domain function value corresponding to each OFDM modulation symbol, the encoding matrix corresponding to the OFDM signal.

As an optional implementation, the determining of the frequency of each OFDM modulation symbol includes:
determining a start frequency, a frequency step value and a stop frequency of the OFDM modulation symbols according to a bandwidth and a first preset parameter of the OFDM modulation symbols; and
determining the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The determining of the start frequency, the frequency step value and the stop frequency of the OFDM modulation symbols according to the bandwidth and the first preset parameter of the OFDM modulation symbols includes:
determining the start frequency and the stop frequency according to the bandwidth, the roll-off factor and the target symbol length of the OFDM modulation symbols; and
determining the frequency step value according to the bandwidth, the roll-off factor and the first parameter of the OFDM modulation symbols.

As an optional implementation, based on the frequency domain function and the frequency of the OFDM modulation symbol, the determining of the frequency domain function value corresponding to the frequency of the OFDM modulation symbol includes:
determining a first threshold and a second threshold according to a bandwidth and a roll-off factor of the OFDM modulation symbols; and
determining, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the frequency domain function is determined through:
weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the linear function is determined by:
determining a slope according to a bandwidth and a roll-off factor of the OFDM modulation symbols, where the slope decreases as the bandwidth and the roll-off factor increase;
determining a linear function variable according to the bandwidth and the roll-off factor of the OFDM modulation symbols and the frequency; and
determining the linear function according to the slope and the linear function variable.

As an optional implementation, phases of the trigonometric functions having different frequencies change as the roll-off factor of the OFDM signal changes; and/or amplitudes of the trigonometric functions increase as the number of the trigonometric functions increases.

As an optional implementation, the trigonometric function is determined by:
determining a phase of the trigonometric function according to a roll-off factor of the OFDM signal;
determining a trigonometric function variable according to a bandwidth and the roll-off factor of the OFDM modulation symbols and the frequency; and
determining the trigonometric function according to the phase and the trigonometric function variable.

As an optional implementation, the frequency domain function is expressed by formulas as follows:

$$C(k) = \frac{a_0}{2\alpha \cdot B\omega} x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

in the formulas, C(k) represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

As an optional implementation, $b_i$ increases as i increases, and $b_i$ is an odd number; and/or
$d_i$ increases as i increases, and $d_i$ is an odd number.

As an optional implementation, according to the frequency domain function value corresponding to each OFDM modulation symbol, the determining of the encoding matrix corresponding to the OFDM signal includes:
determining each frequency domain function value corresponding to the OFDM modulation symbol as an encoding matrix coefficient; and
determining the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

In a third aspect, an embodiment of the disclosure provides a method for determining an inverse encoding matrix. The method includes: obtaining an encoding matrix determined according to any one of the methods in the second aspect; and inverting the encoding matrix, to determine the inverse encoding matrix.

In a fourth aspect, an embodiment of the disclosure provides a method for sending an OFDM signal. The method includes: determining a target OFDM signal according to any one of the methods in the first aspect; and sending the target OFDM signal.

In a fifth aspect, an embodiment of the disclosure provides a method for receiving an OFDM signal. The method includes:
receiving a target OFDM signal determined according to any one of the methods in the first aspect, where the target OFDM signal is obtained through processing by an encoding matrix corresponding to the OFDM signal; and
processing the target OFDM signal according to an inverse encoding matrix, to obtain the OFDM signal, where the inverse encoding matrix is obtained by inverting the encoding matrix corresponding to the OFDM signal.

In a sixth aspect, an embodiment of the disclosure provides an OFDM signal system. The system includes a network device and a terminal. The network device is configured to determine a target OFDM signal according to any one of the methods in the first aspect, and send the target OFDM signal to the terminal, where the target OFDM signal is obtained through processing by an encoding matrix corresponding to the OFDM signal. The terminal is configured to process the target OFDM signal according to an inverse encoding matrix to obtain an OFDM signal, where the inverse encoding matrix is obtained by inverting the encoding matrix corresponding to the OFDM signal.

In a seventh aspect, an embodiment of the disclosure provides a network device. The network device includes a processor and a memory. The memory is configured to store a program capable of being executed by the processor. The processor is configured to read the program in the memory and execute:
determining a frequency of each of OFDM modulation symbols, where the OFDM modulation symbols are obtained by digitally modulating an OFDM signal;
determining, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies;

determining, according to the frequency domain function value corresponding to each OFDM modulation symbol, an encoding matrix corresponding to the OFDM signal; and processing the OFDM signal by the encoding matrix corresponding to the OFDM signal, to obtain a target OFDM signal conforming to a change rule of the frequency domain function.

As an optional implementation, the processor is specifically configured to execute:

determining a start frequency, a frequency step value and a stop frequency of the OFDM modulation symbols according to a bandwidth and a first preset parameter of the OFDM modulation symbols; and determining the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The processor is specifically configured to execute:

determining the start frequency and the stop frequency according to the bandwidth, the roll-off factor and the target symbol length of the OFDM modulation symbols; and determining the frequency step value according to the bandwidth, the roll-off factor and the first parameter of the OFDM modulation symbols.

As an optional implementation, the processor is specifically configured to execute:

determining a first threshold and a second threshold according to a bandwidth and a roll-off factor of the OFDM modulation symbols; and determining, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the processor is specifically configured to determine the frequency domain function through:

weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the processor is specifically configured to determine the linear function by:

determining a slope according to a bandwidth and a roll-off factor of the OFDM modulation symbols, where the slope decreases as the bandwidth and the roll-off factor increase;

determining a linear function variable according to the bandwidth and the roll-off factor of the OFDM modulation symbols and the frequency; and determining the linear function according to the slope and the linear function variable.

As an optional implementation, phases of the trigonometric functions having different frequencies change as the roll-off factor of the OFDM signal changes; and/or amplitudes of the trigonometric functions increase as the number of the trigonometric functions increases.

As an optional implementation, the processor is specifically configured to determine the trigonometric function by:

determining a phase of the trigonometric function according to a roll-off factor of the OFDM signal;

determining a trigonometric function variable according to a bandwidth and the roll-off factor of the OFDM modulation symbols and the frequency; and determining the trigonometric function according to the phase and the trigonometric function variable.

As an optional implementation, the processor is specifically configured to express the frequency domain function by formulas as follows:

$$C(k) = \frac{a_0}{2\alpha \cdot B\omega} x + \sum_{i=1}^{K_1} a_1 \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \mathrm{abs}(f);$$

in the formulas, $C(k)$ represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

As an optional implementation, $b_i$ increases as i increases, and $b_i$ is an odd number; and/or $d_i$ increases as i increases, and $d_i$ is an odd number.

As an optional implementation, the processor is specifically configured to:

determine each frequency domain function value corresponding to the OFDM modulation symbol as an encoding matrix coefficient; and determine the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

As an optional implementation, the processor is specifically configured to:

multiply the encoding matrix corresponding to the OFDM signal by the OFDM signal, to obtain the target OFDM signal conforming to the change rule of the frequency domain function.

In an eighth aspect, an embodiment of the disclosure provides an apparatus for processing an OFDM signal. The apparatus includes:

a frequency determination module, configured to determine a frequency of each of OFDM modulation symbols, where the OFDM modulation symbols are obtained by digitally modulating the OFDM signal;

a frequency domain function module, configured to determine, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies;

an encoding matrix module, configured to determine, according to the frequency domain function value corresponding to each OFDM modulation symbol, an encoding matrix corresponding to the OFDM signal; and a peak to average power ratio reduction module, configured to process the OFDM signal by the encoding matrix corresponding to the OFDM signal, to obtain a target OFDM signal conforming to a change rule of the frequency domain function.

As an optional implementation, the frequency determination module is specifically configured to:

determine a start frequency, a frequency step value and a stop frequency of the OFDM modulation symbols according to a bandwidth and a first preset parameter of the OFDM modulation symbols; and determine the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The frequency determination module is specifically configured to:

determine the start frequency and the stop frequency according to the bandwidth, the roll-off factor and the target symbol length of the OFDM modulation symbols; and determine the frequency step value according to the bandwidth, the roll-off factor and the first parameter of the OFDM modulation symbols.

As an optional implementation, the frequency domain function module is specifically configured to:

determine a first threshold and a second threshold according to a bandwidth and a roll-off factor of the OFDM modulation symbols; and determine, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the frequency domain function module determines the frequency domain function specifically through:

weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the frequency domain function module determines the linear function specifically by:

determining a slope according to a bandwidth and a roll-off factor of the OFDM modulation symbols, where the slope decreases as the bandwidth and the roll-off factor increase;

determining a linear function variable according to the bandwidth and the roll-off factor of the OFDM modulation symbols and the frequency; and determining the linear function according to the slope and the linear function variable.

As an optional implementation, phases of the trigonometric functions having different frequencies change as the roll-off factor of the OFDM signal changes; and/or amplitudes of the trigonometric functions increase as the number of the trigonometric functions increases.

As an optional implementation, the frequency domain function module determines the trigonometric function specifically by:

determining a phase of the trigonometric function according to a roll-off factor of the OFDM signal;

determining a trigonometric function variable according to a bandwidth and the roll-off factor of the OFDM modulation symbols and the frequency; and determining the trigonometric function according to the phase and the trigonometric function variable.

As an optional implementation, the frequency domain function module is specifically configured to express the frequency domain function specifically by formulas as follows:

$$C(k) = \frac{a_0}{2\alpha \cdot B\omega} x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

in the formulas, $C(k)$ represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

As an optional implementation, $b_i$ increases as i increases, and $b_i$ is an odd number; and/or $d_i$ increases as i increases, and $d_i$ is an odd number.

As an optional implementation, the encoding matrix module is specifically configured to:

determine each frequency domain function value corresponding to the OFDM modulation symbol as an encoding matrix coefficient; and determine the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

As an optional implementation, the peak to average power ratio reduction module is specifically configured to:
multiply the encoding matrix corresponding to the OFDM signal by the OFDM signal, to obtain the target OFDM signal conforming to the change rule of the frequency domain function.

In a ninth aspect, an embodiment of the disclosure provides a computer storage medium, storing a computer program. The program is configured to implement steps of the method in the first aspect when executed by a processor.

In a tenth aspect, the disclosure provides a computer program product. The computer program product includes a computer program code. The computer program code causes a computer to execute any one of the methods in the first aspect when running on the computer.

These or other aspects of the disclosure will be simpler, clearer and easier to understand in the description of the following embodiments.

BRIEF DESCRIPTION OF FIGURES

In order to describe technical solutions in embodiments of the disclosure more clearly, accompanying drawings required to be used in descriptions of the embodiments will be briefly introduced below. Apparently, accompanying drawings in the following descriptions are merely some embodiments of the disclosure. Those of ordinary skill in the art would also be able to derive other accompanying drawings according to these accompanying drawings without making creative efforts.

DETAILED DESCRIPTION

Figure 1:
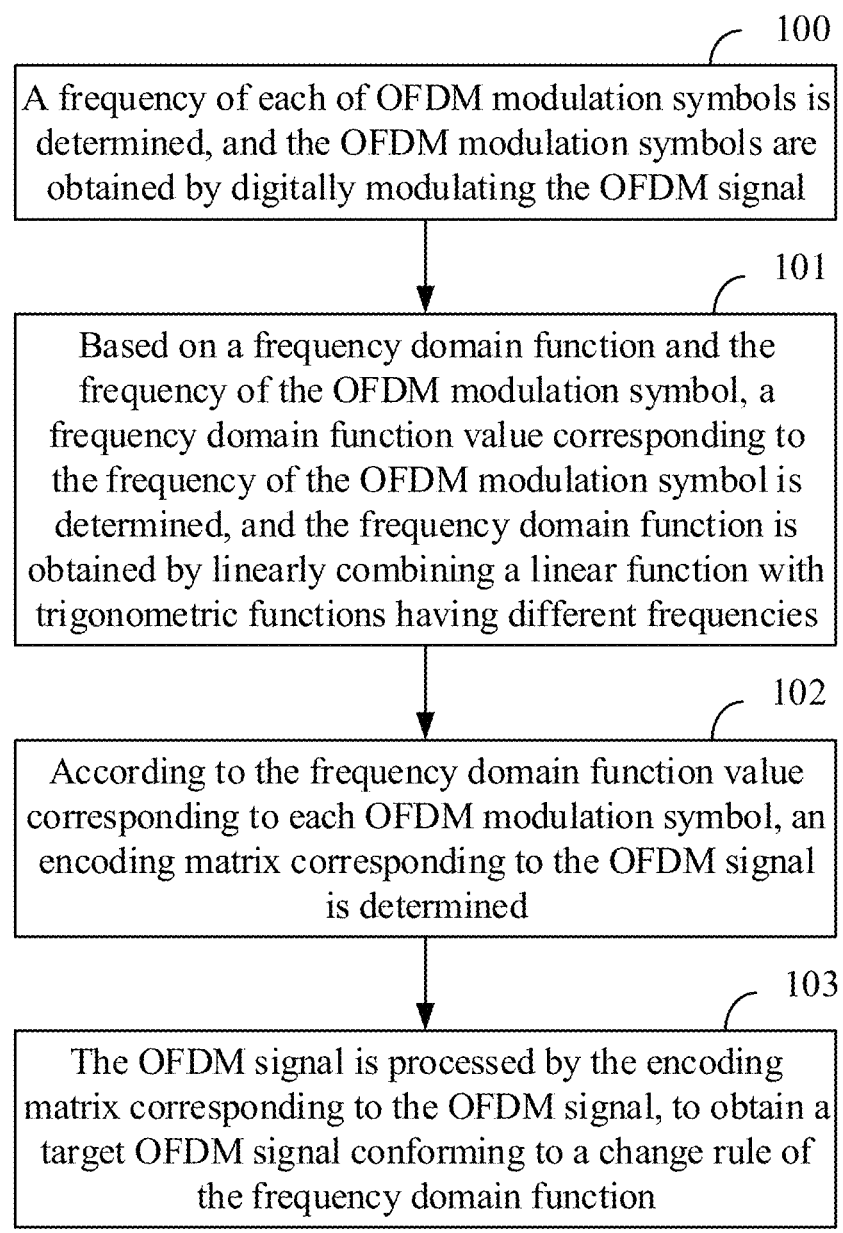
FIG. 1 is a diagram of an implementation flow of a method for processing an OFDM signal according to an embodiment of the disclosure.

In order to make the objectives, technical solutions and advantages of the disclosure more obvious, the disclosure will be described in further detail below in combination with accompanying drawings. Apparently, the described embodiments are merely some embodiments rather than all embodiments of the disclosure. On the basis of embodiments of the disclosure, all other embodiments obtained by those of ordinary skill in the art without creative efforts all fall within the scope of protection of the disclosure.

The term "and/or" in embodiments of the disclosure describes an association relation between associated objects and indicates that there can be three relations. For instance, A and/or B can represent A alone, both A and B, and B alone. The character "/" generally indicates that associated objects in the context are in an "or" relation.

Application scenes described in embodiments of the disclosure are merely used for more clearly describing technical solutions of embodiments of the disclosure, and do not constitute a limitation on technical solutions provided in embodiments of the disclosure. Those of ordinary skill in the art would be able to know that with the evolution of new application scenarios, technical solutions provided in embodiments of the disclosure are also applicable to similar technical problems. In addition, in the description of the disclosure, "plurality of" means two or more, unless otherwise specified.

Before a method for processing an OFDM signal provided in embodiments of the disclosure is introduced, for ease of understanding, the technical background of embodiments of the disclosure will be first introduced in detail below.

The OFDM is a type of multi-carrier modulation technology that divides a carrier into several orthogonal sub-carriers to overcome frequency selective fading and narrow-band interference. Therefore, the OFDM, as a communication signal of a 5G new radio (5G NR, which is a global 5G standard of an OFDM-based new radio design), has more choices of time slots and sub-carriers that each sub-frame can contain, so as to not only support different communication scenarios, but also effectively support different sensing scenarios. However, due to sub-carrier superposition in an OFDM system, the peak power of a signal will be much greater than its average power, that is, a peak to average power ratio (PAPR) is high. Since the power is limited in some scenarios, and a high peak to average power ratio causes out-of-band radiation and in-band distortion in a nonlinear transmission channel, the signal distorts and a bit error rate of the system is increased, deteriorating performance of an OFDM communication system.

Methods for suppressing a peak to average power ratio of an OFDM system mainly include a predistortion method, an encoding method and a probability method. The predistortion method nonlinearly transforms a signal before the signal is input into a power amplifier, such that a peak value of the signal is within a linear dynamic range of the amplifier, and a PAPR of the signal is reduced. The predistortion method includes, for instance, an amplitude limiting method and a companding transformation method. The encoding method generates different code groups by using different codes, and finally selects a code group having a small PAPR for symbol transmission. By weighting the signal, the probability method reduces a probability that a large signal peak occurs. The probability method includes, for instance, a linear transformation (LT) method, a selective mapping (SLM) method, a partial transmission sequence (PTS) method and an iteratively flipping part of the transmission sequence (IPTS) method. Technologies for reducing a peak to average power ratio of an OFDM signal include an amplitude limiting method. The amplitude limiting method is simple but leads to the amplitude limiting noise, which increases the bit error rate of the system and reduces the system performance. The encoding method includes a blocking encoding method which does not distort the signal, but is complex in computation and produces more redundant data. The probability technologies mainly include an SLM method and a PTS method. The SLM and PTS technologies are simple and intuitive, but have a large amount of computation and also require transmission of sideband information, which increases the difficulty and cost of implementing the system.

According to the method for processing an OFDM signal provided in the disclosure, by using a basic idea of a probability method, the frequency domain function is constructed by linearly combining the linear function with the trigonometric functions having different frequencies, the encoding matrix is constructed by using the frequency domain function value corresponding to the frequency of the OFDM modulation symbol, and the whole OFDM signal is processed by using the encoding matrix, so that, the processed target OFDM signal conforms to the change rule of the frequency domain function. The frequency domain function constructed in the disclosure is formed by linearly combining the linear function with the trigonometric functions having different frequencies. By a linear combination between the linear function and the trigonometric functions having different frequencies, the change rule of a frequency spectrum of the OFDM signal can satisfy the requirement of a low PAPR. Therefore, through a probability method which is simple to implement and does not require transmission of sideband information, a PAPR of the OFDM signal can be effectively reduced, so as to not only improve communication performance of an OFDM system, but also improve sensing performance.

A core idea of the method for processing an OFDM signal provided in embodiments of the disclosure is to design an encoding matrix for reducing a PAPR. A frequency domain function is constructed by linearly combining a linear function related to a frequency and trigonometric functions having different frequencies, a frequency domain function value of each OFDM modulation symbol is determined based on the constructed frequency domain function, and an encoding matrix is constructed according to the frequency domain function values. Therefore, the OFDM signal is processed by using the encoding matrix for reducing a PAPR. The encoding matrix for reducing a PAPR is simple to implement and does not require transmission of sideband information, and a PAPR of the OFDM signal can be effectively reduced, so as to not only improve communication performance of an OFDM system, but also improve sensing performance.

As shown in FIG. 1, a method for processing an OFDM signal provided in an embodiment of the disclosure may be applied to a network device, such as a gNodeB (gNB), a macro base station, a micro base station, a central unit (CU) or a distributed unit (DU) in 5G. A specific implementation flow of the method is as follows.

Step 100: a frequency of each of OFDM modulation symbols is determined, and the OFDM modulation symbols are obtained by digitally modulating the OFDM signal.

In implementation, an OFDM signal is received, digital modulation such as quadrature phase shift keying (QPSK) modulation is carried out on the OFDM signal, and corresponding OFDM modulation symbols are obtained. Moreover, the total length S of the OFDM modulation symbols and the total transmission time T of the OFDM modulation symbols are obtained. The transmission time of each OFDM modulation symbol is $$T_s = \frac{T}{S},$$

and a bandwidth of the OFDM modulation symbols is $$BW = \frac{1}{T_s}.$$

Optionally, a first preset parameter may be set. The first preset parameter includes roll-off factor α, a target symbol length N and a first parameter M. The target symbol length is configured to represent a length of the OFDM modulation symbols after being processed by the encoding matrix.

Optionally, a second preset parameter may be further set. The second preset parameter includes a target symbol length N and an extension coefficient L.

In some embodiments, the embodiment determines the frequency of each OFDM modulation symbol by:
  determining a start frequency, a frequency step value and a stop frequency of the OFDM modulation symbols according to a bandwidth and a first preset parameter of the OFDM modulation symbols; and determining the frequency of each OFDM modulation symbol according to the start frequency, the frequency step value and the stop frequency.

In some embodiments, the first preset parameter includes a roll-off factor, a target symbol length and a first parameter. The start frequency and the stop frequency are determined according to a bandwidth, the roll-off factor and the target symbol length of the OFDM modulation symbols, and the frequency step value is determined according to the bandwidth, the roll-off factor and the first parameter of the OFDM modulation symbols.

Optionally, the start frequency is determined according to a formula as follows:

$$f_{begin} = -Bw \cdot (1+\alpha) + \frac{Bw \cdot (1+\alpha)}{N}; \quad \text{formula (1)}$$

In the formula (1), $f_{begin}$ represents the start frequency, Bw represents the bandwidth of the OFDM modulation symbols, α represents the roll-off factor of the OFDM modulation symbols, and N represents the target symbol length.

The stop frequency is determined according to a formula as follows:

$$f_{finish} = Bw \cdot (1+\alpha) - \frac{Bw \cdot (1+\alpha)}{N}; \quad \text{formula (2)}$$

In the formula (2), $f_{finish}$ represents the stop frequency, Bw represents the bandwidth of the OFDM modulation symbols, α represents the roll-off factor of the OFDM modulation symbols, and N represents the target symbol length.

The frequency step value is determined according to a formula as follows:

$$\Delta f = \frac{Bw \cdot (1+\alpha)}{M}; \quad \text{formula (3)}$$

In the formula (3), Δf represents the frequency step value, Bw represents the bandwidth of the OFDM modulation symbols, α represents the roll-off factor of the OFDM modulation symbols, and M represents the first parameter, for instance, M=64.

Step 101: based on a frequency domain function and the frequency of the OFDM modulation symbol, a frequency domain function value corresponding to the frequency of the OFDM modulation symbol is determined, and the frequency domain function is obtained by linearly combining a linear function with trigonometric functions having different frequencies.

Optionally, the trigonometric functions having different frequencies in the embodiment include but are not limited to sine functions having different frequencies, cosine functions having different frequencies, or a combination of sine functions having different frequencies and cosine functions having different frequencies.

Optionally, the trigonometric functions having different frequencies include but are not limited to different harmonic trigonometric functions, which is not excessively limited in the embodiment.

In some embodiments, relations between the frequency of each OFDM modulation symbol and first and second thresholds may be determined first, and the frequency domain function value is determined according to different determination results. A specific determination process is as follows:

a first threshold and a second threshold are determined according to a bandwidth and a roll-off factor of the OFDM modulation symbols; and in a case that an absolute value of the frequency of the OFDM modulation symbol is greater than the first threshold and less than the second threshold, based on the frequency domain function and the frequency of the OFDM modulation symbol, the frequency domain function value corresponding to the frequency of the OFDM modulation symbol is determined.

In implementation, the first threshold T1 and the second threshold T2 are determined according to formulas as follows:

$$T1=Bw*(1-\alpha); T2=Bw*(1+\alpha); \quad \text{formulas (4)}.$$

In the formulas (4), Bw represents the bandwidth of the OFDM modulation symbols, α represents the roll-off factor of the OFDM modulation symbols, T1 represents the first threshold, and T2 represents the second threshold.

Optionally, in a case that an absolute value of the frequency of the OFDM modulation symbol is less than or equal to the first threshold, it is determined that the frequency domain function value corresponding to the frequency of the OFDM modulation symbol is 1; or, in a case that the absolute value of the frequency of the OFDM modulation symbol is greater than or equal to the second threshold, it is determined that the frequency domain function value corresponding to the frequency of the OFDM modulation symbol is 0.

In implementation, assuming the frequency domain function as C(k), if abs(f)≤Bw*(1−α), then C(k)=1; and if abs(f)≥Bw*(1+a), then C(k)=0. Wherein, abs(f) represents the absolute value of the frequency of the OFDM modulation symbol, Bw represents the bandwidth of the OFDM modulation symbols, α represents the roll-off factor of the OFDM modulation symbols, and abs(*) represents an absolute value function.

In some embodiments, the frequency domain function is determined through a method of:

weighted sum of the linear function and the trigonometric functions having different frequencies, according to respective weights of the linear function and the trigonometric functions having different frequencies.

In some embodiments, a slope of the linear function changes as a bandwidth and a roll-off factor of the OFDM signal change.

In some embodiments, the linear function is determined by:

determining a slope according to a bandwidth and a roll-off factor of the OFDM modulation symbols, where the slope decreases as the bandwidth and the roll-off factor increase;

determining a linear function variable according to the bandwidth and the roll-off factor of the OFDM modulation symbols and the frequency of the OFDM modulation symbol; and determining the linear function according to the slope and the linear function variable.

In implementation, the linear function may be represented as formulas as follows:

$$C_1(k) = \frac{a_0}{2\alpha \cdot Bw}x; \text{ and } x = Bw \cdot (1+\alpha) - \text{abs}(f). \quad \text{formulas (5)}$$

In the formulas (5), $C_1(k)$ represents the linear function, $a_0$ represents the weight of the linear function, Bw represents the bandwidth of the OFDM modulation symbols, α represents the roll-off factor of the OFDM modulation symbols, f represents the frequency of the OFDM modulation symbol, and abs(*) represents the absolute value function.

In some embodiments, phases of the trigonometric functions having different frequencies change as the roll-off factor of the OFDM signal changes.

In some embodiments, amplitudes of the trigonometric functions increase as the number of the trigonometric functions increases. Optionally, in a case that the trigonometric functions having different frequencies include sine functions having different frequencies, the amplitudes of the sine functions increase as the number of the sine functions increases. In a case that the trigonometric functions having different frequencies include cosine functions having different frequencies, the amplitudes of the cosine functions increase as the number of the cosine functions increases. In a case that the trigonometric functions having different frequencies include a combination of sine functions having different frequencies and cosine functions having different frequencies, the amplitudes of the sine functions increase as the number of the sine functions increases, and the amplitudes of the cosine functions increase as the number of the cosine functions increases.

In some embodiments, the trigonometric function is determined by:

determining a phase of the trigonometric function according to a roll-off factor of the OFDM signal;

determining a trigonometric function variable according to a bandwidth and a roll-off factor of the OFDM modulation symbols and the frequency of the OFDM modulation symbol; and determining the trigonometric function according to the phase and the trigonometric function variable.

In implementation, the trigonometric functions having different frequencies may be represented as formulas as follows:

$$C_2(k) = \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f).$$

formulas (6)

In the formulas (6), $C_2(k)$ represents the trigonometric functions having different frequencies, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, Bw represents a bandwidth of the OFDM modulation symbols, $\alpha$ represents a roll-off factor of the OFDM modulation symbols, f represents a frequency of the OFDM modulation symbol, and abs(*) represents an absolute value function. Wherein, $a_i>0$ and $c_i \geq 0$.

In some embodiments, the frequency domain function is expressed by formulas as follows:

$$C(k) = \frac{a_0}{2\alpha \cdot B\omega} x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f).$$

formulas (7)

In the formulas, C(k) represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, Bw represents a bandwidth of the OFDM modulation symbols, $\alpha$ represents a roll-off factor of the OFDM modulation symbols, f represents the frequency of the OFDM modulation symbol, and abs(*) represents an absolute value function.

In some embodiment, $b_i$ increases as i increases, and $b_i$ is an odd number. For instance, values of $b_i$ are as follows: $b_1=1$, $b_2=3$, $b_3=5$ and so on. Optionally, $b_i$ is an integer or a decimal.

In some embodiment, $d_i$ increases as i increases, and $d_i$ is an odd number. For instance, values of $d_i$ are as follows: $d_1=1$, $d_2=3$, $d_3=5$ and so on. Optionally, $d_i$ is an integer or a decimal.

Step 102: according to the frequency domain function value corresponding to each OFDM modulation symbol, an encoding matrix corresponding to the OFDM signal is determined.

In some embodiments, the encoding matrix is determined by:

determining each frequency domain function value corresponding to the OFDM modulation symbol as an encoding matrix coefficient; and determining the encoding matrix corresponding to the OFDM signal according to a product of the encoding matrix coefficient corresponding to the OFDM modulation symbol and a phase factor.

In some embodiments, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

Optionally, the phase factor is represented by a formula as follows:

$$pha = \exp\left(-j \cdot 2\pi \odot n \odot \frac{m-L}{N}\right).$$

formula (8)

In the formula (8), pha represents the phase factor, $j=\sqrt{-1}$; n=1, 2, ..., N; m=1, 2, ..., N+2L−1, that is, m represents an integer between 1 and N+2L−1, N represents the target symbol length, L represents the extension coefficient, exp(*) represents an exponential function, and $\odot$ represents a matrix corresponding numerical value multiplication operator.

In implementation, the encoding matrix is represented through a formula as follows:

$$P(n, m) = C(k) \cdot \exp\left(-j \cdot 2\pi \odot n \odot \frac{m-L}{N}\right);$$

formula (9)

In the formula (9), P(n, m) represents the encoding matrix, C(k) represents the frequency domain function corresponding to the OFDM modulation symbol, $j=\sqrt{-1}$; n=1, 2, ..., N; m=1, 2, ..., N+2L−1, that is, m represents an integer between 1 and N+2L−1, N represents the target symbol length, L represents the extension coefficient, exp(*) represents an exponential function, and $\odot$ represents a matrix corresponding numerical value multiplication operator.

Step 103: the OFDM signal is processed by the encoding matrix corresponding to the OFDM signal, to obtain a target OFDM signal conforming to a change rule of the frequency domain function.

In some embodiments, the OFDM signal is processed by the encoding matrix through a method of:

multiplying the encoding matrix corresponding to the OFDM signal by the OFDM signal, to obtain the target OFDM signal conforming to the change rule of the frequency domain function.

Figure 2A:
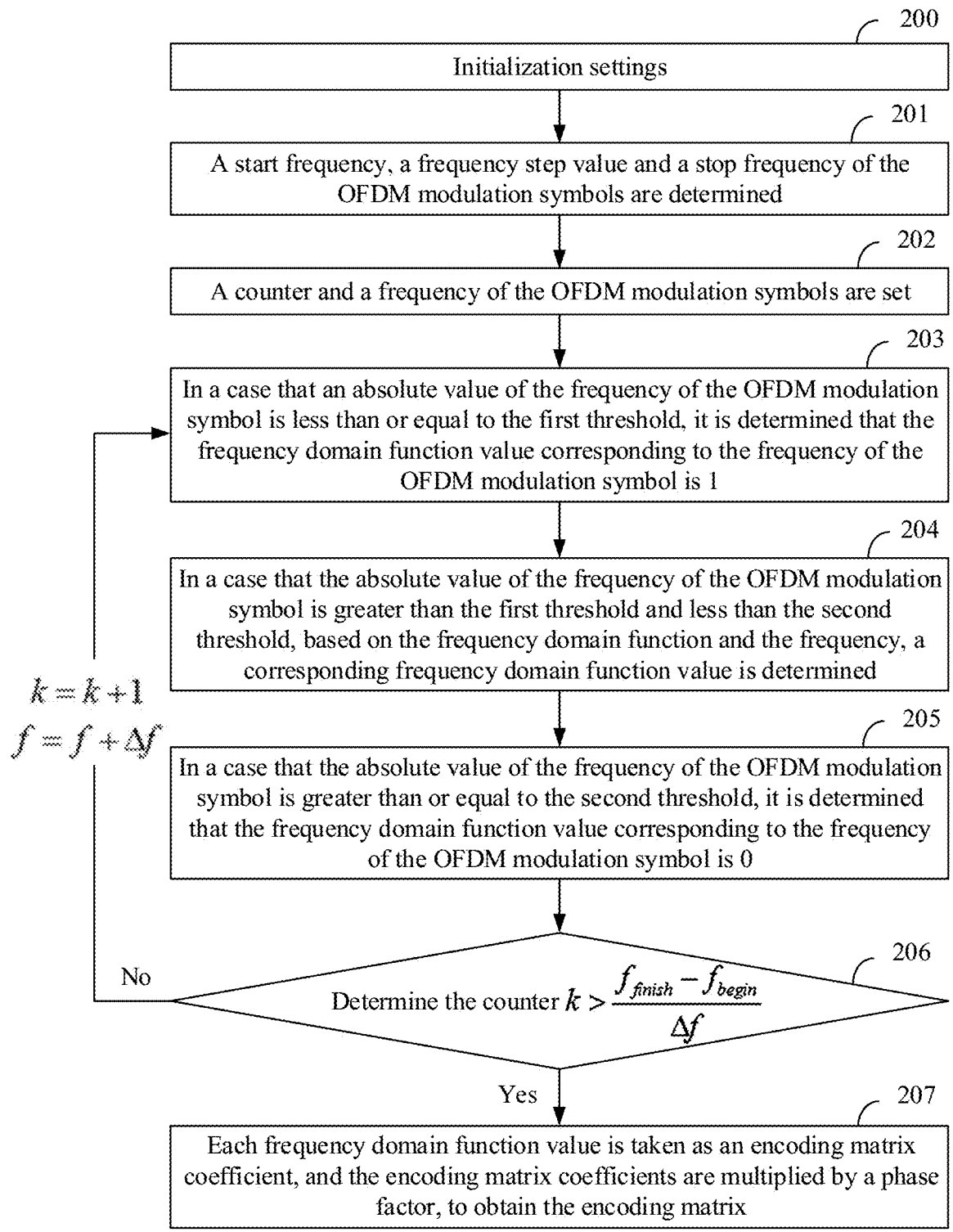
FIGS. 2A and 2B are flow diagrams of determining an encoding matrix according to an embodiment of the disclosure.
Figure 2B:
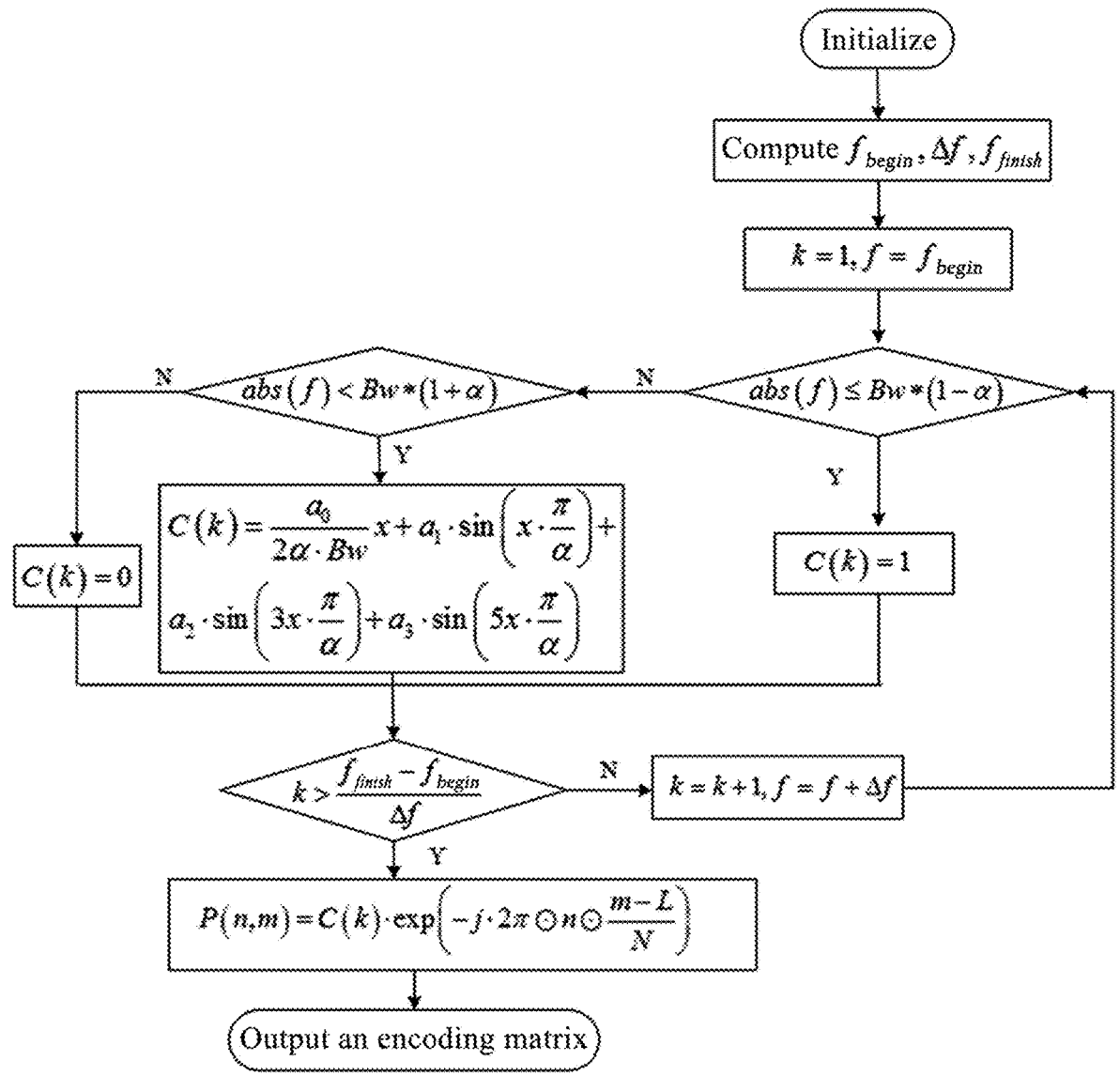

As shown in FIGS. 2A and 2B, the embodiment further provides a flow for determining an encoding matrix. Specific implementation steps are as follows.

Step 200: initialization settings.

A length of the input OFDM modulation symbols is set as S, the time of all OFDM modulation symbols is set as T, the time of each OFDM modulation symbol is set as $$T_s = \frac{T}{S},$$

a bandwidth of all OFDM modulation symbols is set as $$Bw = \frac{1}{T_s},$$

a roll-off factor is set as α, an extension coefficient is set as L, and a length of the input OFDM modulation symbols after being processed by an encoding matrix for reducing a PAPR is set as N.

Step 201: a start frequency $f_{begin}$, a frequency step value Δf and a stop frequency $f_{finish}$ of the OFDM modulation symbols are determined.

Herein, expressions of the start frequency $f_{begin}$, the frequency step value Δf and the stop frequency $f_{finish}$ are as follows:

$$f_{begin} = -Bw \cdot (1+\alpha) + \frac{Bw \cdot (1+\alpha)}{N};$$

here, $f_{begin}$ represents the start frequency, Bw represents the bandwidth of the OFDM modulation symbols, α represents the roll-off factor of the OFDM modulation symbols, and N represents the target symbol length;

$$f_{finish} = Bw \cdot (1+\alpha) - \frac{Bw \cdot (1+\alpha)}{N};$$

here, $f_{finish}$ represents the stop frequency, Bw represents the bandwidth of the OFDM modulation symbols, α represents the roll-off factor of the OFDM modulation symbols, and N represents the target symbol length; and $$\Delta f = \frac{Bw \cdot (1+\alpha)}{M};$$

here, Δf represents the frequency step value, Bw represents the bandwidth of the OFDM modulation symbols, α represents the roll-off factor of the OFDM modulation symbols, and M represents the first parameter, for instance, M=64.

Step 202: a counter k=1 and a frequency $f=f_{begin}$ of the OFDM modulation symbols are set.

From the 1st OFDM modulation symbol, the start frequency is taken as a frequency of the 1st OFDM modulation symbol, a frequency domain function value corresponding to each OFDM frequency is computed through the following steps until the end of a last OFDM modulation symbol, and the stop frequency is taken as a frequency of the last OFDM modulation symbol.

Step 203: in a case that an absolute value of the frequency of the OFDM modulation symbol is less than or equal to the first threshold, it is determined that the frequency domain function value corresponding to the frequency of the OFDM modulation symbol is 1.

In implementation, the first threshold T1=Bw*(1−α). If abs(f)≤Bw*(1−α), then the frequency domain function C(k)=1; here, abs(f) represents the absolute value of the frequency of the OFDM modulation symbol, Bw represents the bandwidth of the OFDM modulation symbols, and a represents the roll-off factor of the OFDM modulation symbols.

Step 204: in a case that the absolute value of the frequency of the OFDM modulation symbol is greater than the first threshold and less than the second threshold, based on the frequency domain function and the frequency, a corresponding frequency domain function value is determined.

Optionally, the embodiment provides an example of the frequency domain function, as follows.

If Bw*(1−α)<abs(f)<Bw*(1+α), then the frequency domain function C(k) is expressed as follows:

$$C(k) = \frac{a_0}{2\alpha \cdot Bw} x + a_1 \cdot \sin\left(x \cdot \frac{\pi}{\alpha}\right) + a_2 \cdot \sin\left(3x \cdot \frac{\pi}{\alpha}\right) + a_3 \cdot \sin\left(5x \cdot \frac{\pi}{\alpha}\right);$$

here, x=Bw·(1+α)−abs(f); $a_0$ represents a combination coefficient of a linear function, $a_1$ represents a combination coefficient of a fundamental sin function, $a_2$ represents a combination coefficient of a triple harmonic sin function, $a_3$ represents a combination coefficient of a quintuple harmonic sin function, abs(f) represents the absolute value of the frequency of the OFDM modulation symbol, Bw represents the bandwidth of the OFDM modulation symbols, and α represents the roll-off factor of the OFDM modulation symbols.

Step 205: in a case that the absolute value of the frequency of the OFDM modulation symbol is greater than or equal to the second threshold, it is determined that the frequency domain function value corresponding to the frequency of the OFDM modulation symbol is 0.

In implementation, if abs(f)>Bw*(1+α), then the frequency domain function C(k)=0. Here, abs(f) represents the absolute value of the frequency of the OFDM modulation symbol, Bw represents the bandwidth of the OFDM modulation symbols, and a represents the roll-off factor of the OFDM modulation symbols.

Step 206: it is determined whether the counter $$k > \frac{f_{finish} - f_{begin}}{\Delta f},$$

if yes, executing step S207; otherwise, enabling k=k+1 and f=f+Δf, and executing step 203.

Step 207: each frequency domain function value is taken as an encoding matrix coefficient, and the encoding matrix coefficients are multiplied by a phase factor, to obtain the encoding matrix.

Herein, the encoding matrix P for reducing a PAPR is formed by multiplying the frequency domain function C(k) by the phase factor, and a computation expression of P is as follows:

$$P(n, m) = C(k) \cdot \exp\left(-j \cdot 2\pi \odot n \odot \frac{m-L}{N}\right);$$

here, $j = \sqrt{-1}$; n = 1, 2, ..., N;

m=1, 2, ..., N+2L−1; N represents the target symbol length, L represents the extension coefficient, exp(*) represents an exponential function, and ⊙ represents a matrix corresponding numerical value multiplication operator.

In some embodiments, an embodiment of the disclosure further provide a process for processing a target OFDM signal after the target OFDM signal is received. The process is specifically as follows:

an encoding matrix corresponding to the OFDM signal is inverted, to obtain an inverse encoding matrix; and the target OFDM signal by the inverse encoding matrix is processed, to obtain the OFDM signal.

Figure 3:
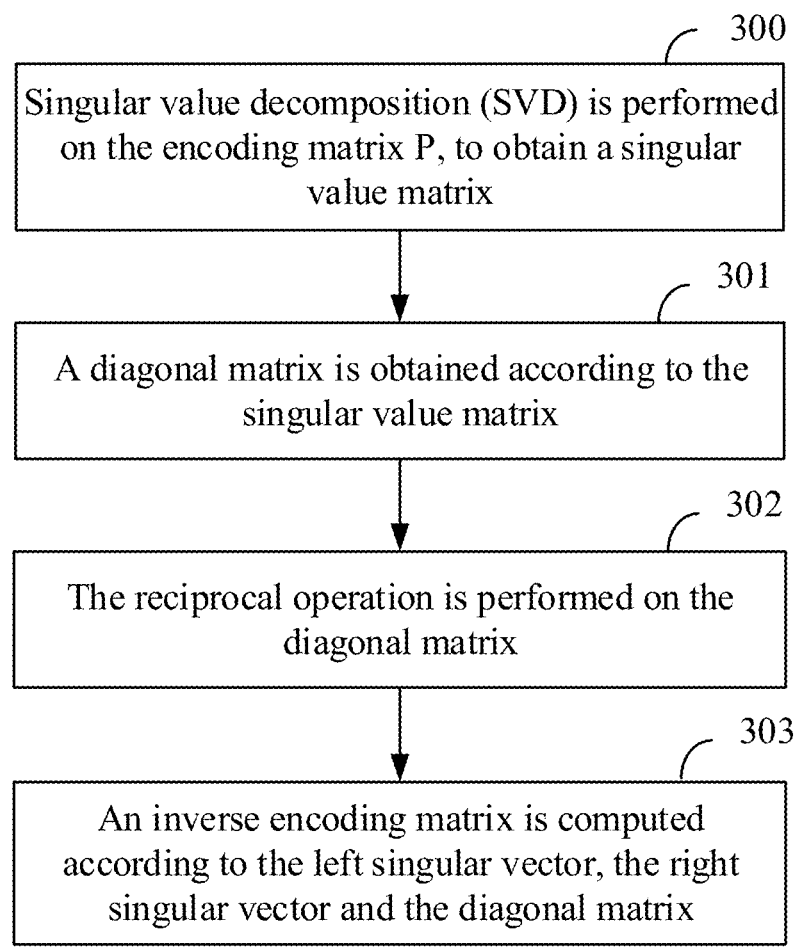
FIG. 3 is a schematic diagram of a solving process of an inverse encoding matrix according to an embodiment of the disclosure.

In implementation, if a transmitting terminal reduces the PAPR of the OFDM signal by the encoding matrix in the embodiments, a receiving terminal is required to recover the original OFDM signal by the inverse encoding matrix of the encoding matrix. As shown in FIG. 3, the embodiment provides a solving process of the inverse encoding matrix, and the inverse encoding matrix may be obtained through steps as follows.

Step 300: singular value decomposition (SVD) is performed on the encoding matrix P, to obtain a singular value matrix.

A computation expression of SVD is [A, B, D]=svd(P); here, svd(*) represents an SVD function; B represents a singular value matrix; A represents a left singular vector; and D represents a right singular vector.

Step 301: a diagonal matrix Q is obtained according to the singular value matrix B. A computation expression of the diagonal matrix Q is Q=diag(B); here, diag(*) is a diagonal matrix generation function.

Step 302: the reciprocal operation is performed on the diagonal matrix Q.

A computation expression of the reciprocal operation is Q'=1./Q.

Step 303: an inverse encoding matrix $P^{-1}$ is computed according to the left singular vector A, the right singular vector D and the diagonal matrix Q.

A computation expression of the inverse encoding matrix $P^{-1}$ is $P^{-1}=(D\odot Q')\cdot A'$; here, (*)' is a matrix transposition operator.

Optionally, the OFDM signal provided in embodiments of the disclosure includes but is not limited to a signal obtained by performing OFDM processing on a physical downlink shared channel (PDSCH), a physical downlink control channel (PDCCH), a physical broadcast channel (PBCH) and other signals.

Figure 4A:
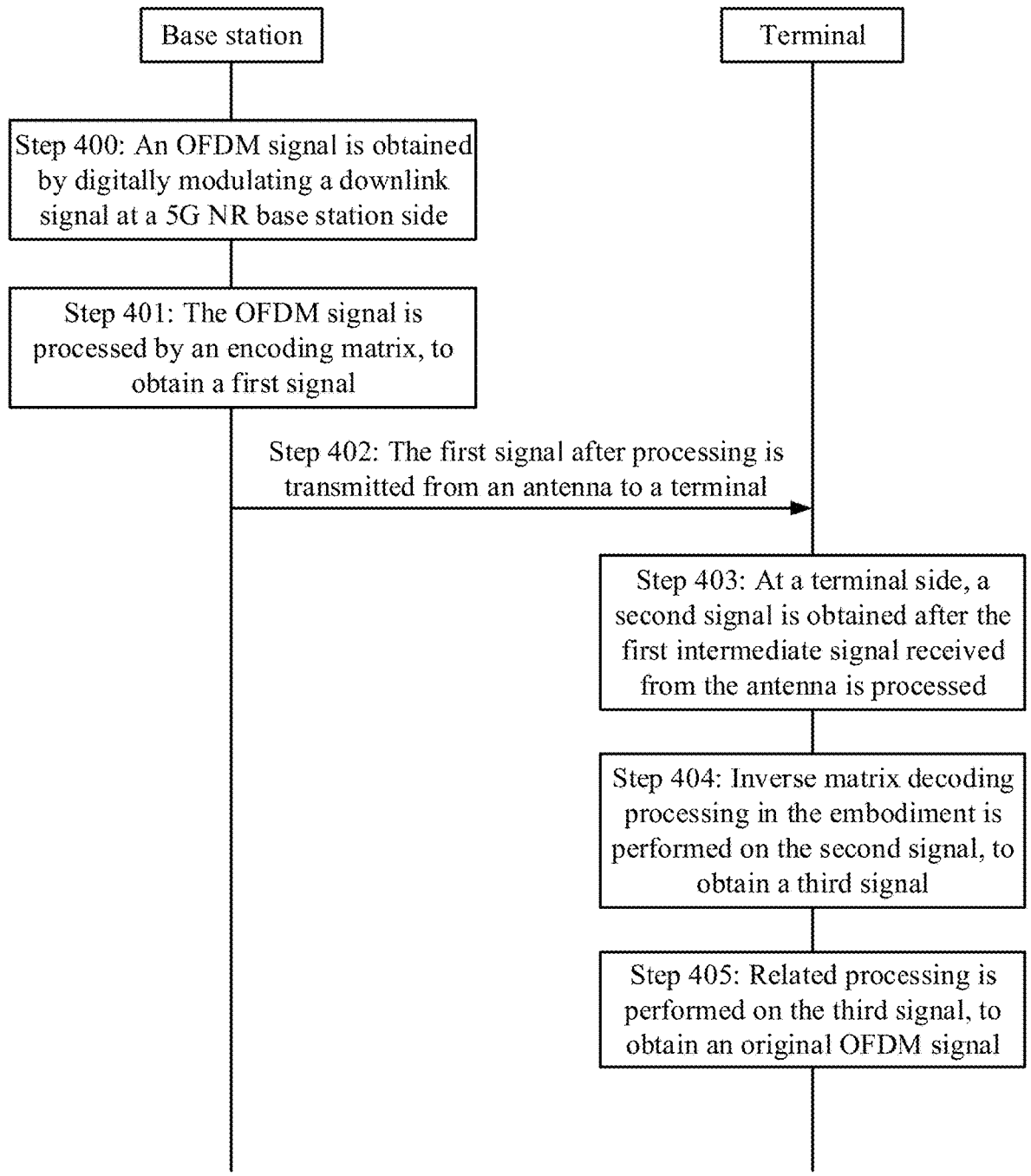
FIGS. 4A and 4B are diagrams of specific implementation flows of a method for processing an OFDM signal according to an embodiment of the disclosure.
Figure 4B:
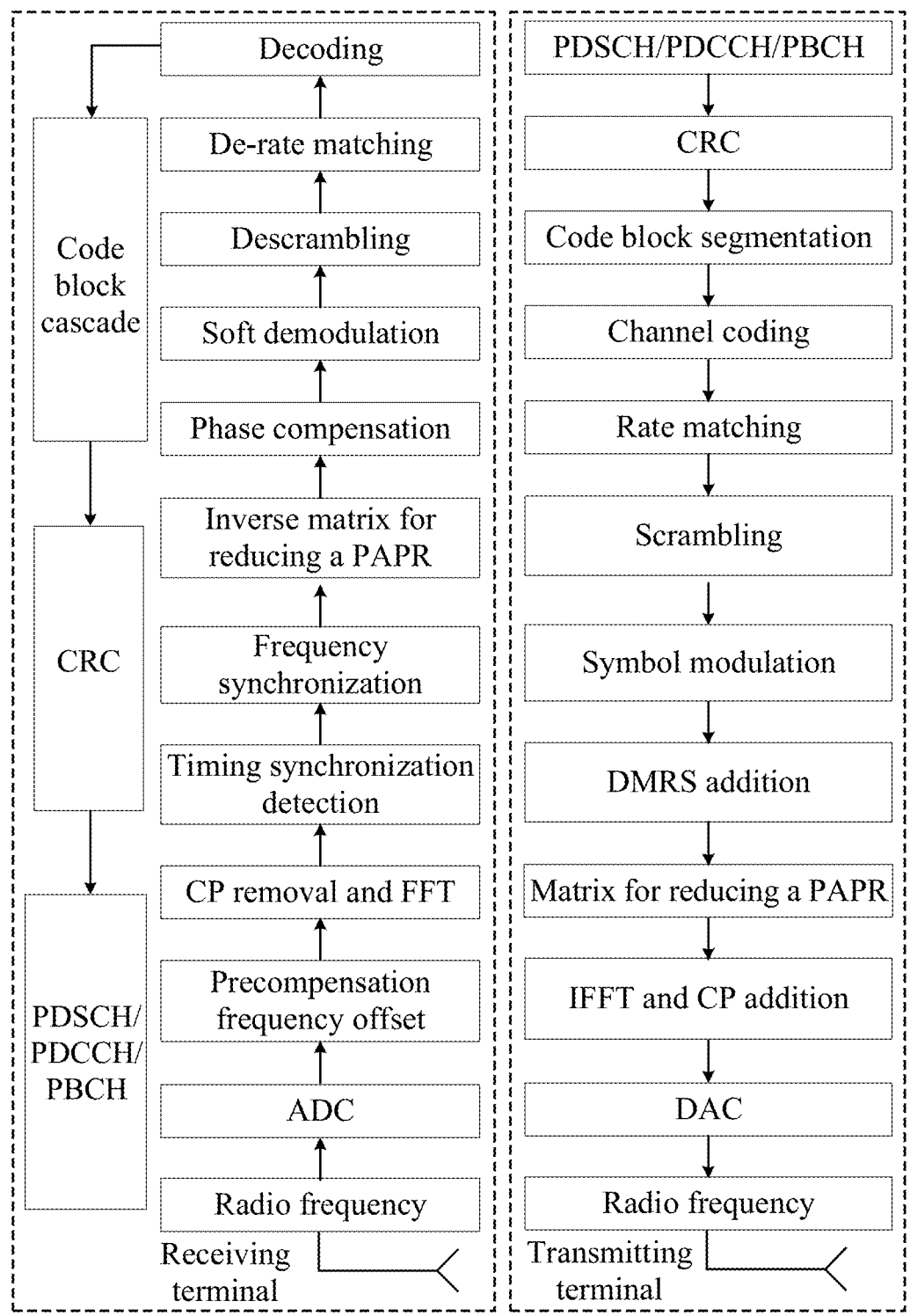

The method for processing an OFDM signal provided in the disclosure may be applied to any wireless communication system using an OFDM technology. As shown in FIGS. 4A and 4B, when the method for processing an OFDM signal is applied to a 5G NR downlink, a specific implementation flow of the method for processing an OFDM signal is as follows.

Step 400: an OFDM signal x_data is obtained by digitally modulating a downlink signal at a 5G NR base station side.

In implementation, a PDSCH/PDCCH/PBCH is subjected to symbol processing of cyclic redundancy check (CRC), code block segmentation, channel encoding, rate matching, scrambling, symbol modulation, and demodulation reference signal (DMRS) addition, to form the signal x_data (that is, an OFDM signal).

Step 401: the OFDM signal x_data is processed by an encoding matrix, to obtain a first signal s_data.

A computation expression of encoding is as follows: s_data=x_data*P; here, P represents the encoding matrix in the embodiment.

Step 402: the first signal s_data after processing is transmitted from an antenna to a terminal.

In implementation, the first signal s_data is transmitted from the antenna after being subjected to the inverse fast fourier transform (IFFT) processing, cyclic prefix (CP) addition, the digital to analog converter (DAC) and radio frequency processing.

Step 403: at a terminal side, a second signal r_data is obtained after the first intermediate signal s_data received from the antenna is processed.

In implementation, the first signal s_data received from an antenna is subjected to processing of radio frequency, analog-to-digital converter (ADC), precompensation frequency offset, CP removal and fast fourier transform (FFT), timing synchronization detection, and frequency synchronization, to form the second signal r_data.

Step 404: inverse matrix decoding processing in the embodiment is performed on the second signal r_data, to obtain the third signal $r_1$_data.

A computation expression of decoding is as follows: $r_1$_data=r_data*$P^{-1}$; here, $P^{-1}$ represents an inverse encoding matrix.

Step 405: related processing is performed on the third signal $r_1$_data, to obtain an original OFDM signal.

In implementation, the third signal $r_1$_data is subjected to processing of phase compensation, soft demodulation, descrambling, de-rate matching, decoding, code block concatenation and CRC, to form PDSCH/PDCCH/PBCH data information.

Figure 5:
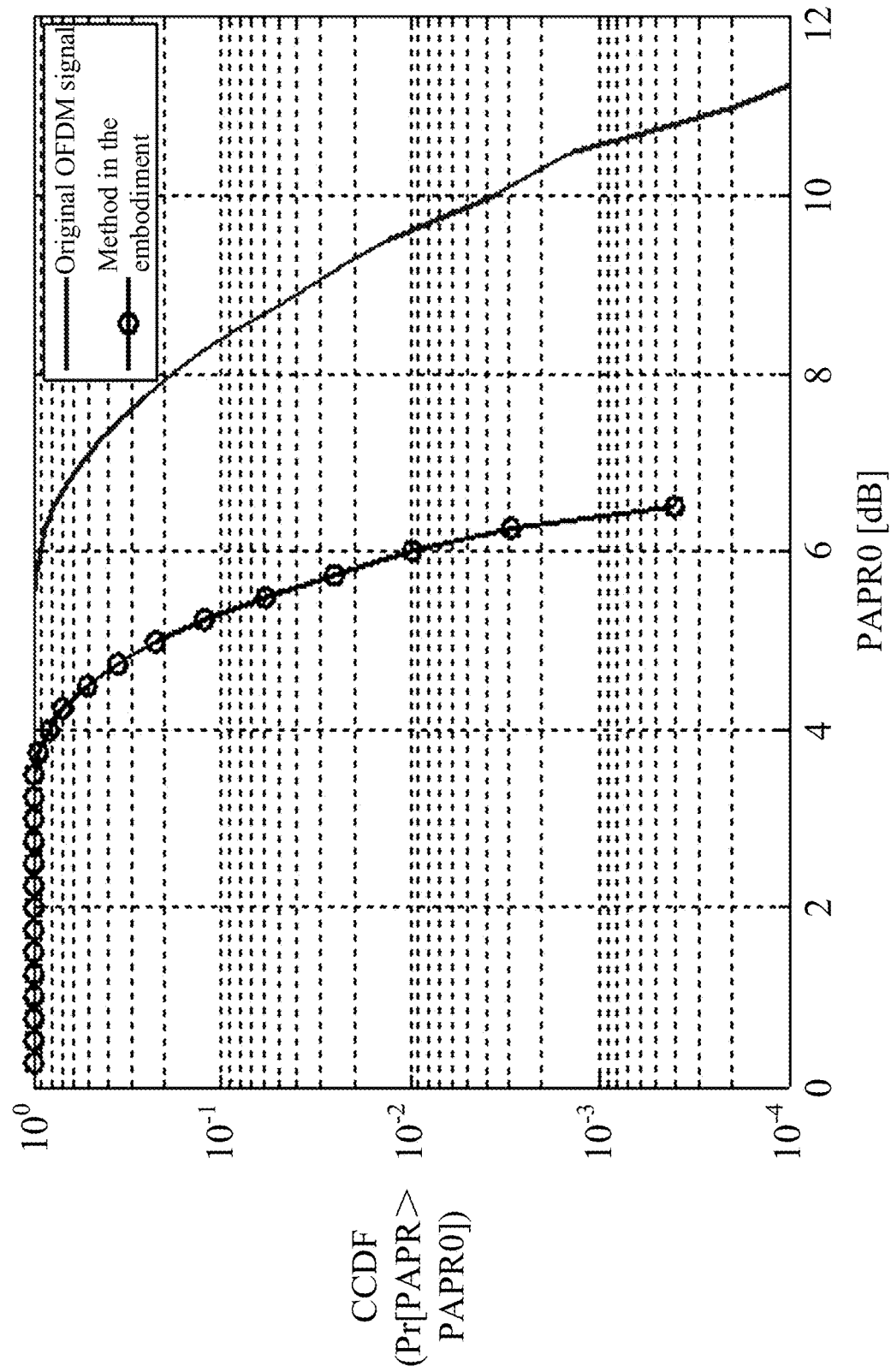
FIG. 5 is a schematic diagram of complementary cumulative distribution function (CCDF) performance comparison between an original OFDM signal and an OFDM signal obtained through processing by an encoding matrix according to an embodiment of the disclosure.

As shown in FIG. 5, the embodiment provides a schematic diagram of complementary cumulative distribution function (CCDF) performance comparison between an original OFDM signal and an OFDM signal obtained through processing by an encoding matrix. The original OFDM signal is an OFDM signal that is subjected to QPSK modulation and has 256 sub-carriers at a sub-carrier interval of 120 KHz. A method for determining an encoding matrix in the embodiments is applied to the practical application. It can be seen from the figure that the encoding matrix in the embodiment has a significant improvement on PAPR performance of the OFDM signal. In a case that CCDF is $10^{-3}$, a PAPR suppression capability of the encoding matrix in the embodiment is improved by 4 dB compared with that of the original OFDM signal.

According to the design of the encoding matrix for reducing a PAPR provided in the embodiments, a frequency domain function is constructed by linearly combining a frequency linear function with frequency trigonometric functions having different frequencies; then, the frequency domain function values are generated based on the constructed frequency domain function and by a start frequency, a stop frequency and a frequency step value of a wideband OFDM signal; and finally, the encoding matrix for reducing a PAPR is formed by multiplying different frequency domain function values by a phase factor. An inverse encoding matrix for reducing a PAPR is obtained by performing SVD on the encoding matrix for reducing a PAPR, processing a singular value matrix to obtain a diagonal matrix, and performing reciprocal operation and other processing; and the method can reduce complexity and computation amount.

The encoding matrix for reducing a PAPR in the embodiment is applied to a wideband OFDM communication system. A transmitting terminal (for instance, a base station) reduces a PAPR of OFDM by an encoding matrix for reducing a PAPR, and a receiving terminal (for instance, a terminal) recovers an original signal by an inverse encoding matrix for reducing a PAPR. The encoding matrix for reducing a PAPR is simple to implement and does not require transmission of sideband information, which can effectively reduce a PAPR of wideband OFDM, so as to not only improve communication performance of the OFDM, but also improve sensing performance.

In the embodiment, a method for processing an OFDM signal by an encoding matrix is to directly multiply the OFDM signal by the encoding matrix to obtain a target OFDM signal. A method for obtaining an OFDM signal is to directly multiply the target OFDM signal by the inverse encoding matrix to obtain the OFDM signal. The method for processing an OFDM signal by the encoding matrix is simple and easy to implement, which can be effectively applied to a wideband OFDM communication system and reduce cost.

Based on the same inventive concept, the embodiment of the disclosure further provides a method for determining an encoding matrix. A principle of solving problems of the method for determining an encoding matrix is similar to that of the method for processing an OFDM signal, so that reference can be made to implementation of the method for processing an OFDM signal implementation of a network device, and repetitions will not be described.

Figure 6:
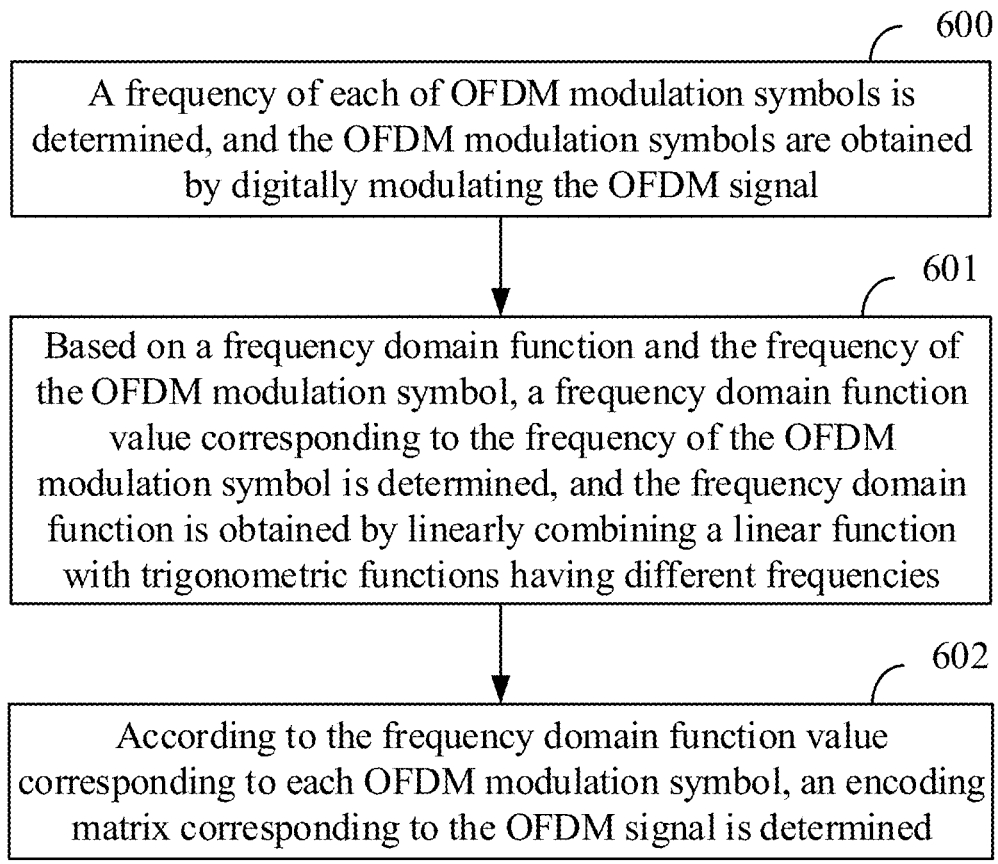
FIG. 6 is a diagram of an implementation flow of a method for determining an encoding matrix according to an embodiment of the disclosure.

As shown in FIG. 6, a specific implementation flow of the method for determining an encoding matrix is as follows:
step 600: a frequency of each of OFDM modulation symbols is determined, and the OFDM modulation symbols are obtained by digitally modulating the OFDM signal;
step 601: based on a frequency domain function and the frequency of the OFDM modulation symbol, a frequency domain function value corresponding to the frequency of the OFDM modulation symbol is determined, and the frequency domain function is obtained by linearly combining a linear function with trigonometric functions having different frequencies; and
Step 602: according to the frequency domain function value corresponding to each OFDM modulation symbol, an encoding matrix corresponding to the OFDM signal is determined.

As an optional implementation, the step of determining the frequency of each OFDM modulation symbol includes:
determining a start frequency, a frequency step value and a stop frequency of the OFDM modulation symbols according to a bandwidth and a first preset parameter of the OFDM modulation symbols; and
determining the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The step of determining the start frequency, the frequency step value and the stop frequency of the OFDM modulation symbols according to the bandwidth and the first preset parameter of the OFDM modulation symbols includes:
determining the start frequency and the stop frequency according to the bandwidth, the roll-off factor and the target symbol length of the OFDM modulation symbols; and
determining the frequency step value according to the bandwidth, the roll-off factor and the first parameter of the OFDM modulation symbols.

As an optional implementation, the step of determining, based on the frequency domain function and the frequency of the OFDM modulation symbol, the frequency domain function value corresponding to the frequency of the OFDM modulation symbol includes:
determining a first threshold and a second threshold according to a bandwidth and a roll-off factor of the OFDM modulation symbols; and
determining, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the frequency domain function is determined through:
weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the linear function is determined by:
determining a slope according to a bandwidth and a roll-off factor of the OFDM modulation symbols, where the slope decreases as the bandwidth and the roll-off factor increase;
determining a linear function variable according to the bandwidth and the roll-off factor of the OFDM modulation symbols and the frequency; and
determining the linear function according to the slope and the linear function variable.

As an optional implementation, phases of the trigonometric functions having different frequencies change as the roll-off factor of the OFDM signal changes; and/or
amplitudes of the trigonometric functions increase as the number of the trigonometric functions increases.

As an optional implementation, the trigonometric function is determined by:
determining a phase of the trigonometric function according to a roll-off factor of the OFDM signal;
determining a trigonometric function variable according to a bandwidth and the roll-off factor of the OFDM modulation symbols and the frequency; and
determining the trigonometric function according to the phase and the trigonometric function variable.

As an optional implementation, the frequency domain function is expressed by formulas as follows:

$$C(k) = \frac{a_0}{2\alpha \cdot B\omega} x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

in the formulas, C(k) represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

As an optional implementation, $b_i$ increases as i increases, and $b_i$ is an odd number; and/or
$d_i$ increases as i increases, and $d_i$ is an odd number.

As an optional implementation, the step of determining, according to the frequency domain function value corresponding to each OFDM modulation symbol, the encoding matrix corresponding to the OFDM signal includes:

determining each frequency domain function value corresponding to the OFDM modulation symbol as an encoding matrix coefficient; and determining the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

Figure 7:
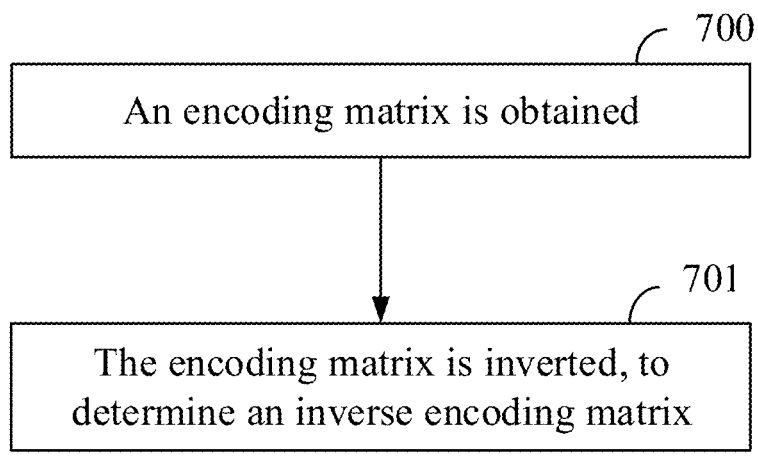
FIG. 7 is a diagram of an implementation flow of a method for determining an inverse encoding matrix according to an embodiment of the disclosure.

Based on the same inventive concept, an embodiment of the disclosure further provides a method for determining an inverse encoding matrix. As shown in FIG. 7, a specific implementation flow of the method is as follows.

Step 700: an encoding matrix is obtained. The encoding matrix is determined by: determining a frequency of each of OFDM modulation symbols, where the OFDM modulation symbols are obtained by digitally modulating an OFDM signal; determining, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies; and determining, according to the frequency domain function value corresponding to each OFDM modulation symbol, the encoding matrix corresponding to the OFDM signal.

Step 701: the encoding matrix is inverted, to determine the inverse encoding matrix.

Figure 8:
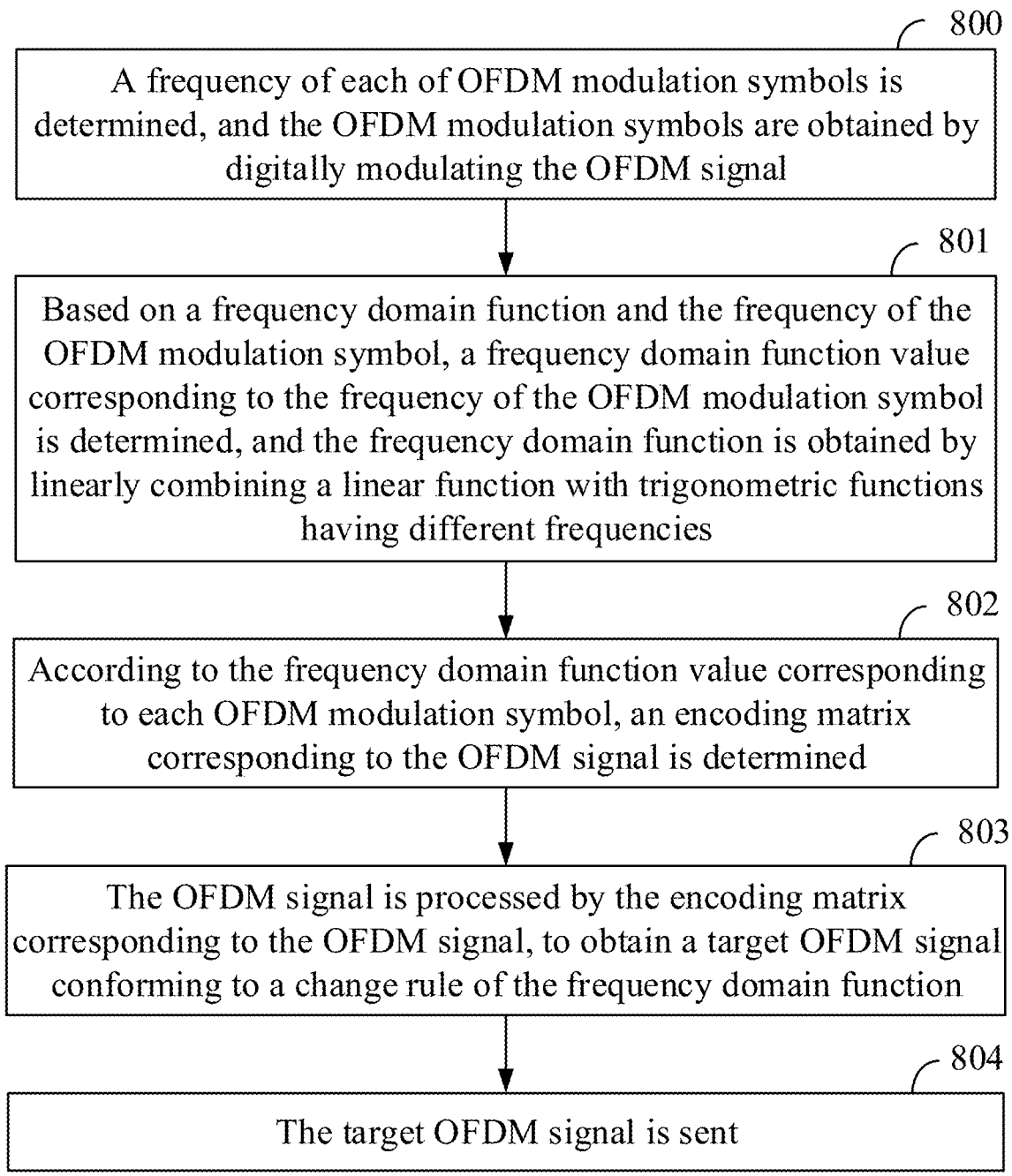
FIG. 8 is a diagram of an implementation flow of a method for sending an OFDM signal according to an embodiment of the disclosure.

Based on the same inventive concept, an embodiment of the disclosure further provides a method for sending an OFDM signal. As shown in FIG. 8, a specific implementation flow of the method is as follows:

step 800: a frequency of each of OFDM modulation symbols is determined, and the OFDM modulation symbols are obtained by digitally modulating the OFDM signal;

step 801: based on a frequency domain function and the frequency of the OFDM modulation symbol, a frequency domain function value corresponding to the frequency of the OFDM modulation symbol is determined, and the frequency domain function is obtained by linearly combining a linear function with trigonometric functions having different frequencies;

step 802: according to the frequency domain function value corresponding to each OFDM modulation symbol, an encoding matrix corresponding to the OFDM signal is determined;

step 803: the OFDM signal is processed by the encoding matrix corresponding to the OFDM signal, to obtain a target OFDM signal conforming to a change rule of the frequency domain function; and step 804: the target OFDM signal is sent.

Figure 9:
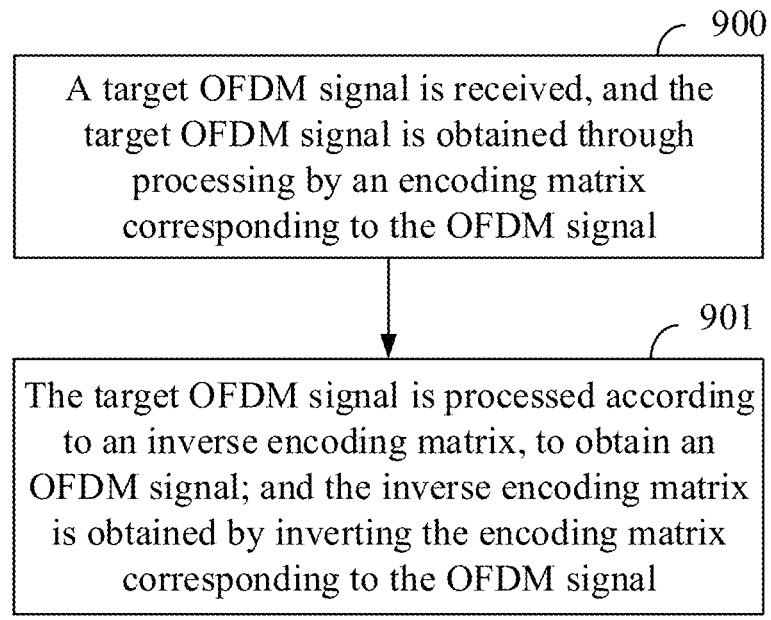
FIG. 9 is a diagram of an implementation flow of a method for receiving an OFDM signal according to an embodiment of the disclosure.

Based on the same inventive concept, an embodiment of the disclosure further provides a method for receiving an OFDM signal. As shown in FIG. 9, a specific implementation flow of the method is as follows:

step 900: a target OFDM signal is received, and the target OFDM signal is obtained through processing by an encoding matrix corresponding to the OFDM signal; and step 901: the target OFDM signal is processed according to an inverse encoding matrix, to obtain an OFDM signal; and the inverse encoding matrix is obtained by inverting the encoding matrix corresponding to the OFDM signal.

Figure 10:
FIG. 10 is a schematic diagram of an OFDM signal system according to an embodiment of the disclosure.

Based on the same inventive concept, an embodiment of the disclosure further provides an OFDM signal system. As shown in FIG. 10, the OFDM signal system includes a sending device 1000 and a receiving device 1001. The sending device 1000 is configured to: determine a frequency of each of OFDM modulation symbols, where the OFDM modulation symbols are obtained by digitally modulating the OFDM signal; determine, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies; determine, according to the frequency domain function value corresponding to each OFDM modulation symbol, an encoding matrix corresponding to the OFDM signal; and process the OFDM signal by the encoding matrix corresponding to the OFDM signal, to obtain a target OFDM signal conforming to a change rule of the frequency domain function, and send the target OFDM signal. The receiving device 1001 is configured to receive the target OFDM signal, and process the target OFDM signal according to an inverse encoding matrix to obtain an OFDM signal. The inverse encoding matrix is obtained by inverting the encoding matrix corresponding to the OFDM signal.

It should be noted that the devices in the disclosure include but are not limited to a sending device and a receiving device. Optionally, the sending device includes a network device, and the receiving device includes a terminal. Alternatively, the sending device includes a terminal, and the receiving device includes a network device.

Based on the same inventive concept, an embodiment of the disclosure further provides a network device. Since the network device is the network device in the method in the embodiments of the disclosure, and the principle of solving problems of the network device is similar to that of the method, reference can be made to implementation of the method for implementation of the network device, and repetitions will not be described.

Figure 11:
FIG. 11 is a schematic diagram of a network device according to an embodiment of the disclosure.

As shown FIG. 11, the network device includes a processor 1100 and a memory 1101. The memory 1101 is configured to store a program capable of being executed by the processor 1100. The processor 1100 is configured to read the program in the memory 1101 and execute:

determining a frequency of each of OFDM modulation symbols, where the OFDM modulation symbols are obtained by digitally modulating an OFDM signal;

determining, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies;

determining, according to the frequency domain function value corresponding to each OFDM modulation symbol, an encoding matrix corresponding to the OFDM signal; and processing the OFDM signal by the encoding matrix corresponding to the OFDM signal, to obtain a target OFDM signal conforming to a change rule of the frequency domain function.

As an optional implementation, the processor 1100 is specifically configured to: determine a start frequency, a frequency step value and a stop frequency of the OFDM modulation symbols according to a bandwidth and a first preset parameter of the OFDM modulation symbols; and determine the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The processor 1100 is specifically configured to:

determine the start frequency and the stop frequency according to the bandwidth, the roll-off factor and the target symbol length of the OFDM modulation symbols; and determine the frequency step value according to the bandwidth, the roll-off factor and the first parameter of the OFDM modulation symbols.

As an optional implementation, the processor 1100 is specifically configured to:

determine a first threshold and a second threshold according to a bandwidth and a roll-off factor of the OFDM modulation symbols; and determine, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the processor 1100 is specifically configured to determine the frequency domain function through:

weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the processor 1100 is specifically configured to determine the linear function by:

determining a slope according to a bandwidth and a roll-off factor of the OFDM modulation symbols, where the slope decreases as the bandwidth and the roll-off factor increase;

determining a linear function variable according to the bandwidth and the roll-off factor of the OFDM modulation symbols and the frequency; and determining the linear function according to the slope and the linear function variable.

As an optional implementation, phases of the trigonometric functions having different frequencies change as the roll-off factor of the OFDM signal changes; and/or amplitudes of the trigonometric functions increase as the number of the trigonometric functions increases.

As an optional implementation, the processor 1100 is specifically configured to determine the trigonometric function by:

determining a phase of the trigonometric function according to a roll-off factor of the OFDM signal;

determining a trigonometric function variable according to a bandwidth and the roll-off factor of the OFDM modulation symbols and the frequency; and determining the trigonometric function according to the phase and the trigonometric function variable.

As an optional implementation, the processor 1100 is specifically configured to express the frequency domain function by formulas as follows:

$$C(k) = \frac{a_0}{2\alpha \cdot B\omega}x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

in the formulas, $C(k)$ represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

As an optional implementation, $b_i$ increases as i increases, and $b_i$ is an odd number; and/or $d_i$ increases as i increases, and $d_i$ is an odd number.

As an optional implementation, the processor 1100 is specifically configured to:

determine each frequency domain function value corresponding to the OFDM modulation symbol as an encoding matrix coefficient; and determine the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

As an optional implementation, the processor 1100 is specifically configured to:

multiply the encoding matrix corresponding to the OFDM signal by the OFDM signal, to obtain the target OFDM signal conforming to the change rule of the frequency domain function.

Figure 12:
FIG. 12 is a schematic diagram of a terminal according to an embodiment of the disclosure.

Based on the same inventive concept, an embodiment of the disclosure further provides a terminal. As shown in FIG. 12, the terminal includes a processor 1200 and a memory 1201. The memory 1201 is configured to store a program capable of being executed by the processor 1200. The processor 1200 is configured to read the program in the memory 1201 and execute:

receiving a target OFDM signal, where the target OFDM signal is obtained through processing by an encoding matrix corresponding to the OFDM signal; and processing the target OFDM signal according to an inverse encoding matrix, to obtain the OFDM signal, where the inverse encoding matrix is obtained by inverting the encoding matrix corresponding to the OFDM signal.

Based on the same inventive concept, an embodiment of the disclosure further provides an apparatus for processing an OFDM signal. Since the apparatus is the apparatus in the method in the embodiments of the disclosure, and the principle of solving problems by the apparatus is similar to that of the method, reference can be made to implementation of the method for implementation of the apparatus, and repetitions will not be described herein.

Figure 13:
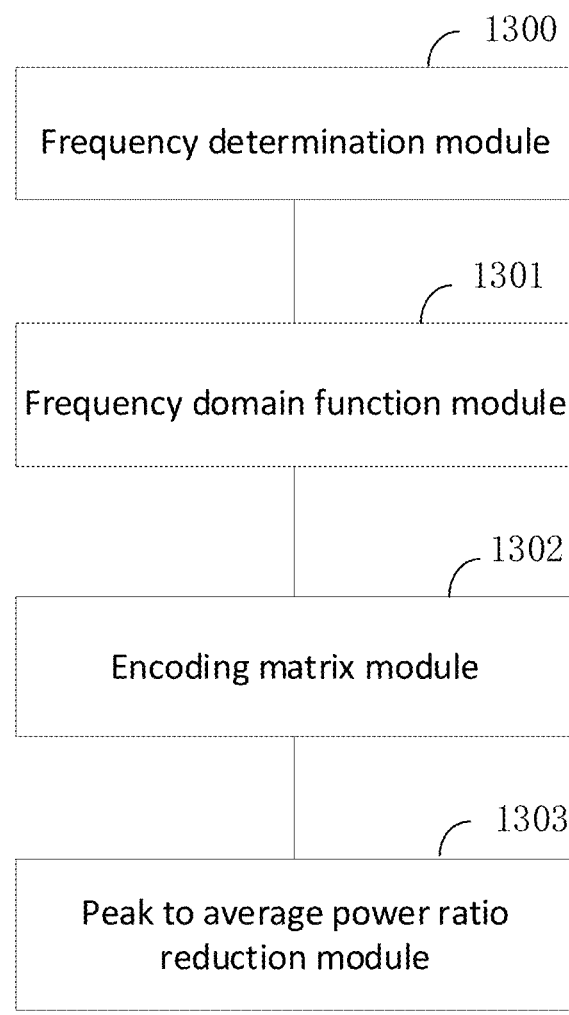
FIG. 13 is a schematic diagram of an apparatus for processing an OFDM signal according to an embodiment of the disclosure.

As shown in FIG. 13, the apparatus includes:
a frequency determination module 1300, configured to determine a frequency of each of OFDM modulation symbols, where the OFDM modulation symbols are obtained by digitally modulating the OFDM signal;
a frequency domain function module 1301, configured to determine, based on a frequency domain function and the frequency of the OFDM modulation symbol, a frequency domain function value corresponding to the frequency of the OFDM modulation symbol, where the frequency domain function is obtained by linearly combining a linear function with trigonometric functions having different frequencies;
an encoding matrix module 1302, configured to determine, according to the frequency domain function value corresponding to each OFDM modulation symbol, an encoding matrix corresponding to the OFDM signal; and
a peak to average power ratio reduction module 1303, configured to process the OFDM signal by the encoding matrix corresponding to the OFDM signal, to obtain a target OFDM signal conforming to a change rule of the frequency domain function.

As an optional implementation, the frequency determination module 1300 is specifically configured to:
determine a start frequency, a frequency step value and a stop frequency of the OFDM modulation symbols according to a bandwidth and a first preset parameter of the OFDM modulation symbols; and
determine the frequency of each OFDM modulation symbol according to the start frequency, the frequency step value and the stop frequency.

As an optional implementation, the first preset parameter includes a roll-off factor, a target symbol length and a first parameter. The target symbol length is configured to represent a length of the OFDM modulation symbols after being processed by the encoding matrix. The frequency determination module 1300 is specifically configured to:
determine the start frequency and the stop frequency according to the bandwidth, the roll-off factor and the target symbol length of the OFDM modulation symbols; and
determine the frequency step value according to the bandwidth, the roll-off factor and the first parameter of the OFDM modulation symbols.

As an optional implementation, the frequency domain function module 1301 is specifically configured to:
determine a first threshold and a second threshold according to a bandwidth and a roll-off factor of the OFDM modulation symbols; and
determine, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

As an optional implementation, the frequency domain function module 1301 determines the frequency domain function specifically through:
weighted sum of the linear function and the trigonometric functions having different frequencies, according to respective weights of the linear function and the trigonometric functions having different frequencies.

As an optional implementation, a slope of the linear function changes as a bandwidth and a roll-off factor of the OFDM signal change.

As an optional implementation, the frequency domain function module 1301 determines the linear function specifically by:
determining a slope according to a bandwidth and a roll-off factor of the OFDM modulation symbols, where the slope decreases as the bandwidth and the roll-off factor increase;
determining a linear function variable according to the bandwidth and the roll-off factor of the OFDM modulation symbols and the frequency; and
determining the linear function according to the slope and the linear function variable.

As an optional implementation, phases of the trigonometric functions having different frequencies change as the roll-off factor of the OFDM signal changes; and/or
amplitudes of the trigonometric functions increase as the number of the trigonometric functions increases.

As an optional implementation, the frequency domain function module 1301 determines the trigonometric function specifically by:
determining a phase of the trigonometric function according to a roll-off factor of the OFDM signal;
determining a trigonometric function variable according to a bandwidth and the roll-off factor of the OFDM modulation symbols and the frequency; and
determining the trigonometric function according to the phase and the trigonometric function variable.

As an optional implementation, the frequency domain function module 1301 is specifically configured to express the frequency domain function specifically by formulas as follows:

$$C(k) = \frac{a_0}{2\alpha \cdot B\omega} x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

in the formulas, $C(k)$ represents the frequency domain function, $a_0$ represents a weight of the linear function, $K_1$ represents the number of sine functions having different frequencies, $a_i$ represents a weight of an ith sine function, $b_i$ represents an amplitude of the ith sine function, $K_2$ represents the number of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, $f$ represents the frequency of the OFDM modulation symbol, and abs(*) represents an absolute value function.

As an optional implementation, $b_i$ increases as i increases, and $b_i$ is an odd number; and/or
$d_i$ increases as i increases, and $d_i$ is an odd number.

As an optional implementation, the encoding matrix module 1302 is specifically configured to:

determine each frequency domain function value corresponding to the OFDM modulation symbol as an encoding matrix coefficient; and determine the encoding matrix corresponding to the OFDM signal according to a product of the encoding matrix coefficient corresponding to the OFDM modulation symbol and a phase factor.

As an optional implementation, as a second preset parameter of the OFDM modulation symbols changes, the phase factor changes according to a change rule of an exponential function. The second preset parameter includes a target symbol length and an extension coefficient. The target symbol length is configured to represent a length of the OFDM modulation symbols after being processed by the encoding matrix.

As an optional implementation, the peak to average power ratio reduction module 1303 is specifically configured to:

multiply the encoding matrix corresponding to the OFDM signal by the OFDM signal, to obtain the target OFDM signal conforming to the change rule of the frequency domain function.

Based on the same inventive concept, an embodiment of the disclosure provides a computer storage medium. The computer storage medium includes a computer program code. The computer program code causes a computer to execute any one of the methods for processing an OFDM signal as discussed above when running on the computer. Since the principle of solving problems of the above computer storage medium is similar to that of the method for processing an OFDM signal, reference can be made to implementation of the method for implementation of the computer storage medium, and repetitions will not be described.

In a specific implementation flow, the computer storage media may include various storage media capable of storing program codes, such as a universal serial bus flash drive (USB), a removable hard disk, a read-only memory (ROM), a random access memory (RAM), a magnetic disk or an optical disk.

Based on the same inventive concept, an embodiment of the disclosure further provides a computer program product. The computer program product includes a computer program code. The computer program code causes a computer to execute any one of the methods for processing an OFDM signal as discussed above when running on the computer. Since the principle of solving problems of the computer program product is similar to that of the method for processing an OFDM signal, reference can be made to implementation of the method for implementation of the computer program product, and repetitions will not be described.

Any combination of one or more readable media can be used as the computer program product. A readable medium may be a readable signal medium or a readable storage medium. The readable storage medium may be, for instance, but not is limited to, an electronic, magnetic, optical, electromagnetic, infrared or semiconductor system, apparatus or device, or any combination of the foregoing. More specific instances (a non-exhaustive list) of the readable storage media include an electrical connector having one or more wires, a portable computer disk, a hard disk, a random access memory (RAM), an read-only memory (ROM), an erasable programmable read-only memory (EPROM or a flash memory), an optical fiber, a compact disc read-only memory (CD-ROM), an optical storage device, a magnetic storage device or any suitable combination of the foregoing.

Those skilled in the art should understand that embodiments of the disclosure can be provided as methods, systems or computer program products. Therefore, the disclosure can employ full hardware embodiments, full software embodiments, or software and hardware combined embodiments. Moreover, the disclosure can employ a computer program product implemented on one or more computer storage media (including but not limited to disc memories and optical memories, etc.) containing computer program codes.

The disclosure is described with reference to flow diagrams and/or block diagrams of a method, device (system) and computer program product in embodiments of the disclosure. It should be understood that each flow and/or block in the flow diagrams and/or block diagrams and combinations of the flows and/or blocks in the flow diagrams and/or block diagrams can be implemented by means of computer program instructions. These computer program instructions can be provided for a processor of a general-purpose computer, a special-purpose computer, an embedded processor, or other programmable data processing devices to produce a machine, such that instructions executed by the processor of the computer or other programmable data processing devices produce an apparatus for implementing specified functions in one or more flows in each flow diagram and/or one or more blocks in each block diagram.

These computer program instructions may be also stored in a computer readable memory that can guide a computer or other programmable data processing devices to work in a specific way, such that instructions stored in the computer readable memory produce an article of manufacture including an instruction apparatus, and the instruction apparatus implements specified functions in one or more flows in each flow diagram and/or one or more blocks in each block diagram.

These computer program instructions can be loaded onto a computer or other programmable data processing devices, such that a series of operations and steps are executed on the computer or other programmable devices to generate computer-implemented processing. Therefore, the instructions executed on the computer or other programmable devices provide steps for implementing specific functions in one or more flows in each flow diagram and/or one or more blocks in each block diagram.

Apparently, those skilled in the art can make various modifications and variations to the disclosure without departing from the spirit and scope of the disclosure. In this way, if these modifications and variations of the disclosure fall within the scope of the claims of the disclosure and their equivalent technologies, the disclosure is further intended to include these modifications and variations.

What is claimed is:

1. A method for processing an orthogonal frequency division multiplexing (OFDM) signal, comprising:

determining a frequency of each of OFDM modulation symbols, wherein the OFDM modulation symbols are obtained by digitally modulating the OFDM signal;

determining, based on a frequency domain function and the frequency of the OFDM modulation symbol, a frequency domain function value corresponding to the frequency of the OFDM modulation symbol, wherein the frequency domain function is obtained by linearly combining a linear function with trigonometric functions having different frequencies;

determining, according to the frequency domain function value corresponding to each OFDM modulation symbol, an encoding matrix corresponding to the OFDM signal; and processing the OFDM signal by the encoding matrix corresponding to the OFDM signal, to obtain a target OFDM signal conforming to a change rule of the frequency domain function.

2. The method according to claim 1, wherein the determining the frequency of each of the OFDM modulation symbols comprises:
determining a start frequency, a frequency step value and a stop frequency of the OFDM modulation symbols according to a bandwidth and a first preset parameter of the OFDM modulation symbols; and
determining the frequency of each OFDM modulation symbol according to the start frequency, the frequency step value and the stop frequency.

3. The method according to claim 2, wherein the first preset parameter comprises a roll-off factor, a target symbol length and a first parameter, and the target symbol length is configured to represent a length of the OFDM modulation symbols after being processed by the encoding matrix;
wherein the determining the start frequency, the frequency step value and the stop frequency of the OFDM modulation symbols according to the bandwidth and the first preset parameter of the OFDM modulation symbols comprises:
determining the start frequency and the stop frequency according to the bandwidth, the roll-off factor and the target symbol length of the OFDM modulation symbols; and
determining the frequency step value according to the bandwidth, the roll-off factor and the first parameter of the OFDM modulation symbols.

4. The method according to claim 1, wherein the determining, based on the frequency domain function and the frequency of the OFDM modulation symbol, the frequency domain function value corresponding to the frequency of the OFDM modulation symbol comprises:
determining a first threshold and a second threshold according to a bandwidth and a roll-off factor of the OFDM modulation symbols; and
determining, based on the frequency domain function and the frequency of the OFDM modulation symbol, the frequency domain function value corresponding to the frequency of the OFDM modulation symbol in a case that an absolute value of the frequency of the OFDM modulation symbol is greater than the first threshold and less than the second threshold.

5. The method according to claim 1, wherein the frequency domain function is determined through:
weighted sum of the linear function and the trigonometric functions having different frequencies, according to respective weights of the linear function and the trigonometric functions having different frequencies.

6. The method according to claim 1, wherein a slope of the linear function changes as a bandwidth and a roll-off factor of the OFDM modulation symbols change.

7. The method according to claim 1, wherein the linear function is determined by:
determining a slope according to a bandwidth and a roll-off factor of the OFDM modulation symbols, wherein the slope decreases as the bandwidth and the roll-off factor increase;
determining a linear function variable according to the bandwidth and the roll-off factor of the OFDM modulation symbols and the frequency of the OFDM modulation symbol; and
determining the linear function according to the slope and the linear function variable.

8. The method according to claim 1, wherein
phases of the trigonometric functions having different frequencies change as the roll-off factor of the OFDM signal changes; and/or
amplitudes of the trigonometric functions increase as a quantity of the trigonometric functions increases.

9. The method according to claim 1, wherein the trigonometric function is determined by:
determining a phase of the trigonometric function according to a roll-off factor of the OFDM modulation symbols;
determining a trigonometric function variable according to a bandwidth and the roll-off factor of the OFDM modulation symbols and the frequency; and
determining the trigonometric function according to the phase and the trigonometric function variable.

10. The method according to claim 1, wherein the frequency domain function is expressed by formulas as follows:

$$C(k) = \frac{a_0}{2\alpha \cdot B\omega} x + \sum_{i=1}^{K_1} a_i \cdot \sin\left(b_i x \cdot \frac{\pi}{\alpha}\right) + \sum_{i=1}^{K_2} c_i \cdot \cos\left(d_i x \cdot \frac{\pi}{\alpha}\right);$$

$$x = Bw \cdot (1 + \alpha) - \text{abs}(f);$$

wherein, $C(k)$ represents the frequency domain function, $a_0$ represents a weight of the linear function, $K_1$ represents a quantity of sine functions having different frequencies, $a_i$ represents a weight of an ith sine function, $b_i$ represents an amplitude of the ith sine function, $K_2$ represents a quantity of cosine functions having different frequencies, $c_i$ represents a weight of an ith cosine function, $d_i$ represents an amplitude of the ith cosine function, $B\omega$ represents a bandwidth of the OFDM modulation symbols, $\alpha$ represents a roll-off factor of the OFDM modulation symbols, f represents the frequency of the OFDM modulation symbol, and abs(*) represents an absolute value function.

11. The method according to claim 10, wherein $b_i$ increases as i increases, and $b_i$ is an odd number; and/or
$d_i$ increases as i increases, and $d_i$ is an odd number.

12. The method according to claim 1, wherein the determining, according to the frequency domain function value corresponding to each OFDM modulation symbol, the encoding matrix corresponding to the OFDM signal comprises:
determining each frequency domain function value corresponding to the OFDM modulation symbol as an encoding matrix coefficient; and
determining the encoding matrix corresponding to the OFDM signal according to a product of the encoding matrix coefficient corresponding to the OFDM modulation symbol and a phase factor.

13. The method according to claim 12, wherein
as a second preset parameter of the OFDM modulation symbols changes, the phase factor changes according to a change rule of an exponential function; and
the second preset parameter comprises a target symbol length and an extension coefficient, and the target symbol length is configured to represent a length of the OFDM modulation symbols after being processed by the encoding matrix.

14. The method according to claim 1, wherein the processing the OFDM signal by the encoding matrix corresponding to the OFDM signal, to obtain the target OFDM signal conforming to the change rule of the frequency domain function comprises:

multiplying the encoding matrix corresponding to the OFDM signal by the OFDM signal, to obtain the target OFDM signal conforming to the change rule of the frequency domain function.

15. A method for determining an encoding matrix, comprising:

determining a frequency of each of orthogonal frequency division multiplexing (OFDM) modulation symbols, wherein the OFDM modulation symbols are obtained by digitally modulating an OFDM signal;

determining, based on a frequency domain function and the frequency of the OFDM modulation symbol, a frequency domain function value corresponding to the frequency of the OFDM modulation symbol, wherein the frequency domain function is obtained by linearly combining a linear function with trigonometric functions having different frequencies; and determining, according to the frequency domain function value corresponding to each OFDM modulation symbol, the encoding matrix corresponding to the OFDM signal.

16. A method for sending an OFDM signal, comprising:

determining a target OFDM signal according to the method of claim 1; and sending the target OFDM signal.

17. A device, comprising a processor and a memory, wherein the memory is configured to store a program capable of being executed by the processor, and the processor is configured to read the program in the memory and execute steps of the method according to claim 1.

18. A non-transitory computer storage medium, storing a computer program, wherein the computer program implements steps of the method according to claim 1 when executed by a processor.

* * * * *